United States Patent
McCarley et al.

(10) Patent No.: US 11,731,767 B2
(45) Date of Patent: Aug. 22, 2023

(54) CONFIGURABLE VEHICLE SEAT AND METHOD THEREFOR

(71) Applicant: The Boeing Company, Chicago, IL (US)

(72) Inventors: Michael C. McCarley, Titusville, FL (US); Christopher Ferguson, Cape Canaveral, FL (US)

(73) Assignee: THE BOEING COMPANY, Chicago, IL (US)

( * ) Notice: Subject to any disclaimer, the term of this patent is extended or adjusted under 35 U.S.C. 154(b) by 44 days.

(21) Appl. No.: 17/172,787

(22) Filed: Feb. 10, 2021

(65) Prior Publication Data

US 2021/0253256 A1 Aug. 19, 2021

Related U.S. Application Data

(60) Continuation of application No. 16/593,366, filed on Oct. 4, 2019, now Pat. No. 11,053,009, which is a
(Continued)

(51) Int. Cl.
| | |
|---|---|
| *B64D 11/06* | (2006.01) |
| *B29C 64/386* | (2017.01) |
| *B64G 1/62* | (2006.01) |
| *B60N 2/24* | (2006.01) |
| *B60N 2/64* | (2006.01) |
| *B64G 1/60* | (2006.01) |
| *B33Y 10/00* | (2015.01) |
| *B33Y 50/02* | (2015.01) |

(Continued)

(52) U.S. Cl.
CPC ........ *B64D 11/0689* (2013.01); *B29C 64/386* (2017.08); *B33Y 10/00* (2014.12); *B33Y 50/02* (2014.12); *B33Y 80/00* (2014.12); *B60N 2/24* (2013.01); *B60N 2/643* (2013.01); *B64D 11/062* (2014.12); *B64D 11/064* (2014.12); *B64D 11/0642* (2014.12); *B64G 1/60* (2013.01); *B64G 1/62* (2013.01); *G05B 19/4099* (2013.01); *B29L 2031/771* (2013.01); *G05B 2219/35134* (2013.01); *G05B 2219/49007* (2013.01)

(58) Field of Classification Search
CPC ................ A47C 7/5068; B64D 11/062; B64D 11/0642; B64D 11/0639; B64D 11/0689; B64G 1/60; B60N 2/643
USPC ........................ 297/338, 473, 423.36, 423.35
See application file for complete search history.

(56) References Cited

U.S. PATENT DOCUMENTS

2,619,157 A 11/1952 Guyton et al.
2,847,061 A 8/1958 Morton
(Continued)

FOREIGN PATENT DOCUMENTS

| DE | 3718645 A1 * | 3/1988 | ........... A47C 1/0342 |
|---|---|---|---|
| GB | 2387537 A * | 10/2003 | ............ B60N 2/002 |

*Primary Examiner* — Milton Nelson, Jr.
(74) *Attorney, Agent, or Firm* — Perman & Green, LLP

(57) ABSTRACT

An adjustable vehicle seat including a seat frame forming a seat back, the seat frame being configured to couple with an aerospace vehicle, and a seat pan coupled to the seat frame, where one or more of the seat frame and the seat pan is configured to couple the seat pan to the seat frame in one of a plurality of positions relative to the seat frame so that an eye position of a seat occupant relative to instrumentation within the aerospace vehicle is decoupled from a size of the seat occupant.

33 Claims, 25 Drawing Sheets

Related U.S. Application Data division of application No. 15/599,752, filed on May 19, 2017, now Pat. No. 10,481,588.

(60) Provisional application No. 62/449,633, filed on Jan. 24, 2017.

(51) Int. Cl.
  *B33Y 80/00* (2015.01)
  *G05B 19/4099* (2006.01)
  *B29L 31/00* (2006.01)

(56) References Cited

U.S. PATENT DOCUMENTS

| | | | |
|---|---|---|---|
| 3,165,355 A | 1/1965 | Hitchcock et al. | |
| 3,694,029 A * | 9/1972 | Noble | B64D 25/06 |
| | | | 297/484 |
| 3,826,434 A | 7/1974 | Von Beckh | |
| 3,880,463 A | 4/1975 | Shephard et al. | |
| 3,902,755 A * | 9/1975 | Sirot | B64D 11/064 |
| | | | 297/339 |
| 4,004,763 A | 1/1977 | Bunnell, III et al. | |
| 4,484,778 A | 11/1984 | Cousins et al. | |
| 4,508,386 A | 4/1985 | Hofmann | |
| 4,615,856 A | 10/1986 | Silverman | |
| 4,828,325 A | 5/1989 | Brooks | |
| 5,112,018 A * | 5/1992 | Wahls | B60N 2/1853 |
| | | | 248/419 |
| 5,556,169 A | 9/1996 | Parrish et al. | |
| 6,141,889 A | 11/2000 | Baum | |
| 6,302,482 B1 * | 10/2001 | Moll | A47C 3/265 |
| | | | 297/340 |
| 6,758,520 B2 * | 7/2004 | Pehrson | B60N 2/3086 |
| | | | 297/339 |
| 6,811,186 B1 * | 11/2004 | Fraley | B60R 22/20 |
| | | | 297/483 |
| 7,040,708 B2 | 5/2006 | Black | |
| 8,696,065 B2 * | 4/2014 | Udriste | B64D 11/06 |
| | | | 297/409 |
| 8,733,843 B2 | 5/2014 | Matthias et al. | |
| 2001/0056309 A1 | 12/2001 | Prabhat et al. | |
| 2002/0167213 A1 | 11/2002 | Warner et al. | |
| 2006/0061167 A1 * | 3/2006 | Adragna | B60N 2/62 |
| | | | 297/284.1 |
| 2006/0145021 A1 | 7/2006 | Barackman et al. | |
| 2007/0273192 A1 * | 11/2007 | Van Druff | B60N 2/4242 |
| | | | 297/339 |
| 2010/0140999 A1 | 6/2010 | Kladde | |
| 2015/0108804 A1 * | 4/2015 | Meister | B60N 2/10 |
| | | | 297/313 |
| 2015/0145295 A1 | 5/2015 | Cecinas et al. | |
| 2016/0016492 A1 | 1/2016 | Subramanian et al. | |
| 2017/0021930 A1 | 1/2017 | Henshaw | |
| 2017/0073076 A1 | 3/2017 | Ozaki | |

* cited by examiner

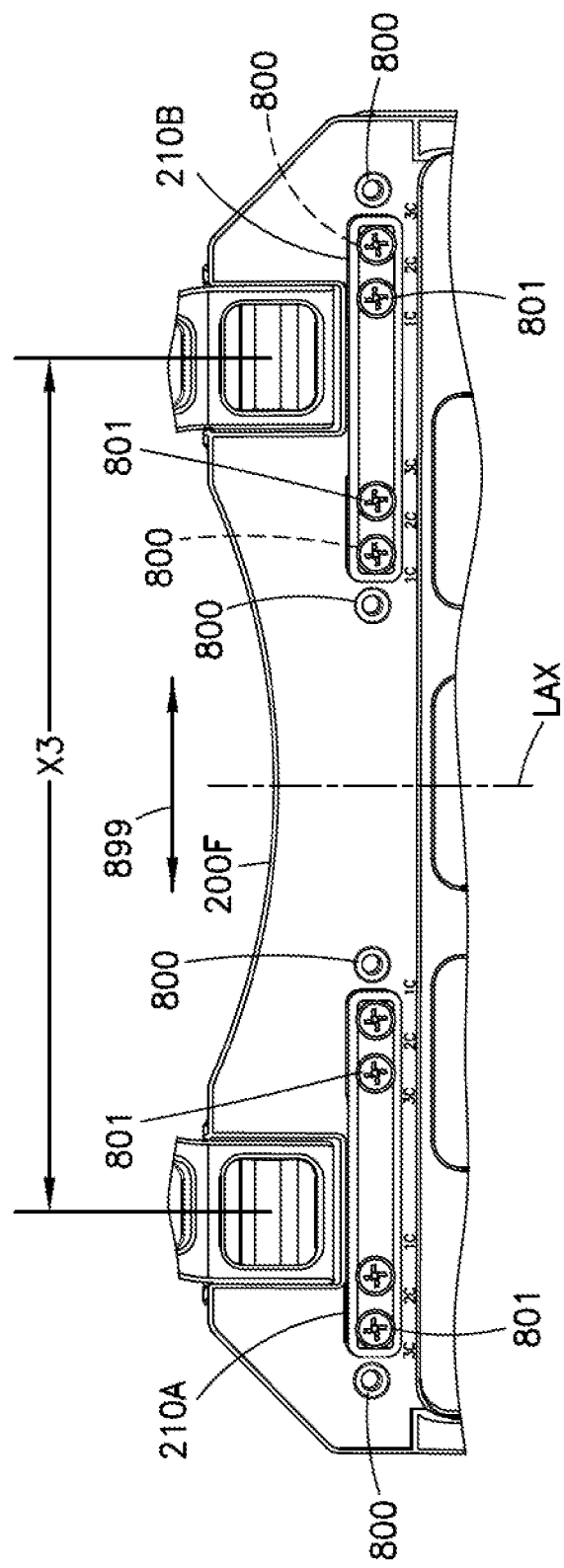

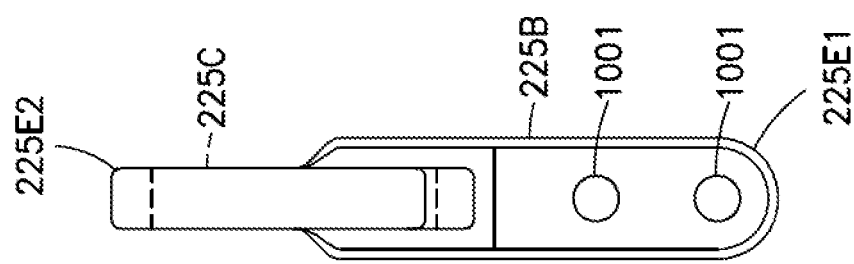
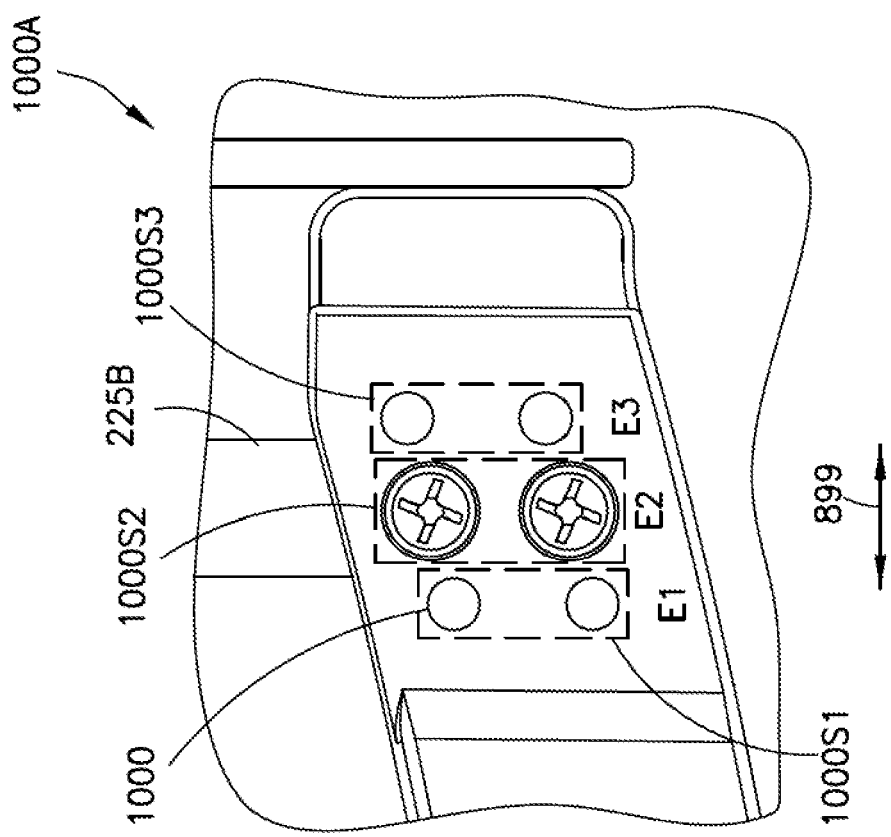

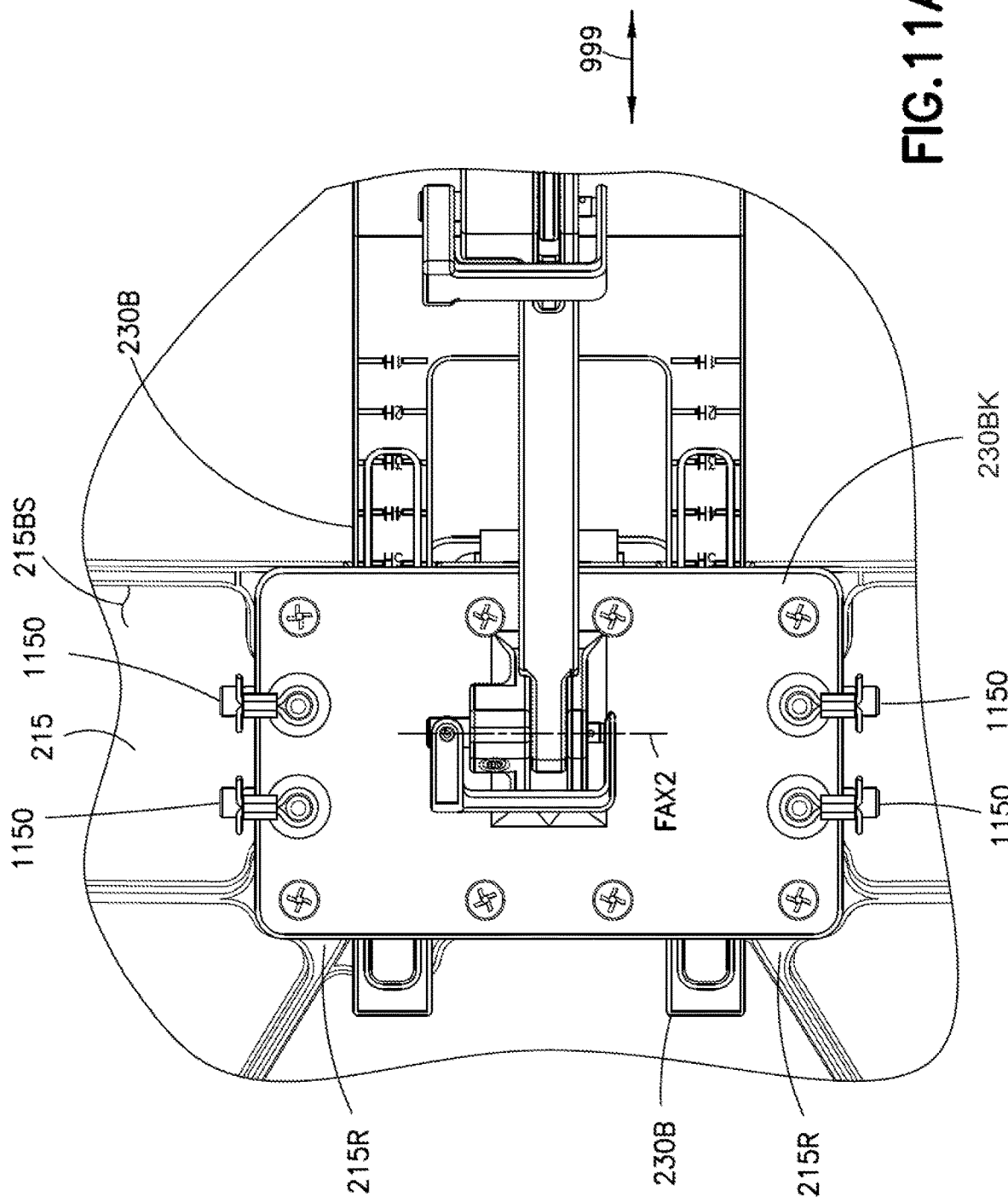

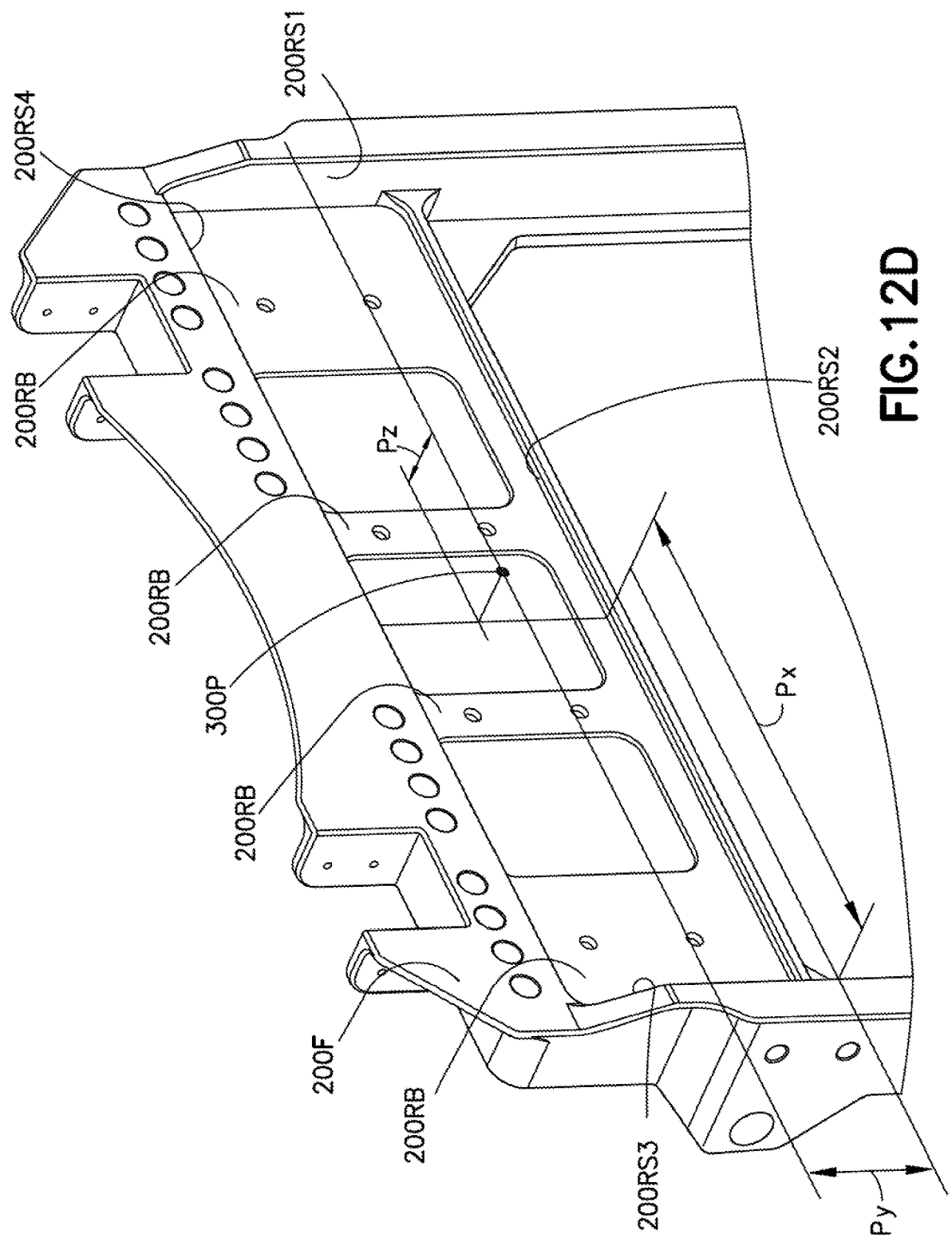

CONFIGURABLE VEHICLE SEAT AND METHOD THEREFOR

CROSS-REFERENCE TO RELATED APPLICATIONS

This application is a continuation of U.S. patent application Ser. No. 16/593,366 filed on Oct. 4, 2019 (now U.S. Pat. No. 11,053,009 issued on Jul. 6, 2021) which is a divisional of U.S. patent application Ser. No. 15/599,752 filed on May 19, 2017 (now U.S. Pat. No. 10,481,588 issued on Nov. 19, 2019), the disclosures of which are incorporated herein by reference in their entireties. U.S. patent application Ser. No. 15/599,752 is a non-provisional of and claims the benefit of U.S. Provisional Patent Application No. 62/449,633 filed on Jan. 24, 2017, the disclosure of which is incorporated by reference herein in its entirety.

The disclosure described herein was made in the performance of work under National Aeronautics and Space Administration (NASA) Contract No. NNK14MA75C and is subject to the provisions of Section 305 of the National Aeronautics and Space Act of 1958 (72 Stat. 435: 42 U.S.C. 2457). NASA has certain rights in this application.

BACKGROUND

1. Field

The aspects of the present disclosure generally relate to vehicle seats and in particular vehicle seats that are adjustable and reconfigurable to conform to a seat occupant's anthropometric dimensions.

2. Brief Description of Related Developments

Generally in aerospace applications, including the United States space shuttle and Apollo programs, vehicle seats had fixed seat pans so that the seat pan determined placement of the seat occupant's head and shoulders. The fixed seat pan resulted in, for example, a wide variation in eye position relative to vehicle displays and controls. In these instances, the seat occupant had to adjust to the seat limitations (e.g. decreased or difficult viewing/control with respect to the vehicle displays and controls) or the seat occupant would not be chosen to participate in the programs due to limitations with the seat's ability to provide adequate positioning for the seat occupant to view the vehicle displays and controls.

Further, prior art vehicle seats, such as those of the United States space shuttle program were not designed to accommodate large lateral loads associated with a landing of a space capsule and as such did not include suitable flail restraints for the seat occupant's lower extremities. The seats for the Apollo program did accommodate for flail restraint of the seat occupant's lower extremities through a heel lock located on a foot tray of the seat; however, while effective the heel lock required significant time to release the locks.

Current conventional seating for high g force applications require multiple sizes of seat structural components, fully conformal contouring, or a lack of lateral support within the seat. The current conventional seating also relies on components surrounding the seat to maintain position and alignment of the seat occupant's body during instances of high g force application.

SUMMARY

The following is a non-exhaustive list of examples, which may or may not be claimed, of the subject matter according to the present disclosure.

In one aspect, a conformal seat insert for an adjustable vehicle seat is provided. The conformal seat insert includes an insert frame, the insert frame having one or more insert reference features for locating the insert frame on a seat frame of the vehicle seat in a predetermined position relative to the seat frame; and a contoured support surface formed in the insert frame, the contoured support surface having a crew reference point corresponding to an acromial point of a shoulder of a seat occupant of the adjustable vehicle seat, the crew reference point being a datum from which an eye position of the seat occupant is established relative to instrumentation of an aerospace vehicle in which the adjustable vehicle seat is located.

In one aspect, a method of making a conformal seat insert for an adjustable vehicle seat includes positioning a seat occupant in a recumbent position on a seat replicator; scanning an upper torso of the seat occupant and generating a solid body model of the upper torso based on the scanning of the upper torso; and generating the conformal seat insert based on the solid body model of the upper torso so that the conformal seat insert includes a contoured support surface having a crew reference point corresponding to an acromial point of a shoulder of a seat occupant of the adjustable vehicle seat, the crew reference point being a datum from which an eye position of the seat occupant is established relative to instrumentation of an aerospace vehicle in which the adjustable vehicle seat is located.

In one aspect, a method of making an adjustable vehicle seat includes providing a seat frame; positioning a seat occupant in a recumbent position on a seat replicator; scanning an upper torso of the seat occupant and generating a solid body model of the upper torso based on the scanning of the upper torso; generating a conformal seat insert based on the solid body model of the upper torso so that the conformal seat insert includes a contoured support surface having a crew reference point corresponding to an acromial point of a shoulder of a seat occupant of the adjustable vehicle seat; and coupling the conformal seat insert to the seat frame in a predetermined position relative to the seat frame so that the crew reference point of the conformal seat insert forms a datum from which an eye position of the seat occupant is established relative to instrumentation of an aerospace vehicle in which the adjustable vehicle seat is located.

BRIEF DESCRIPTION OF THE DRAWINGS

Figure 1:
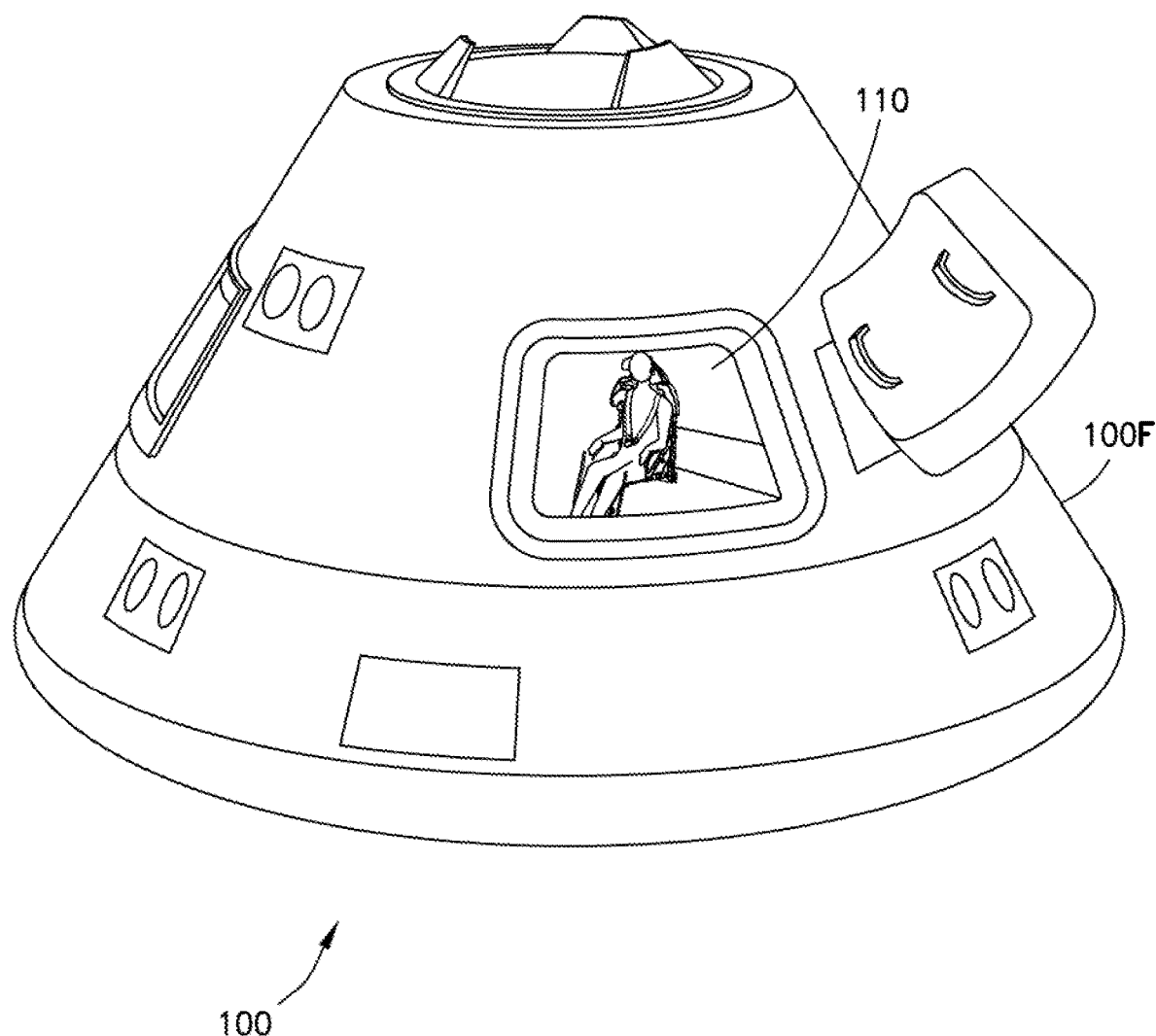
Figure 2:
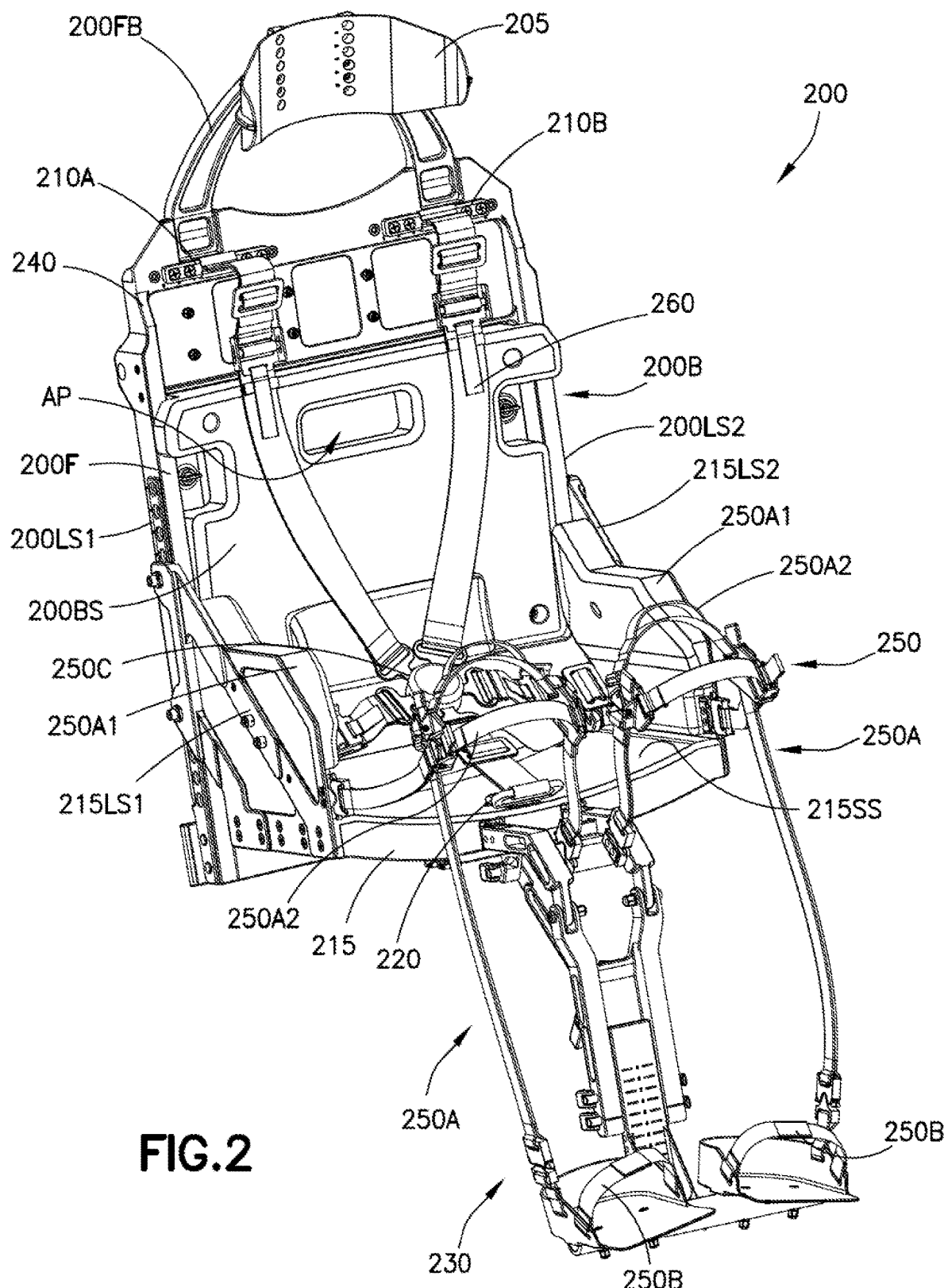
Figure 3:
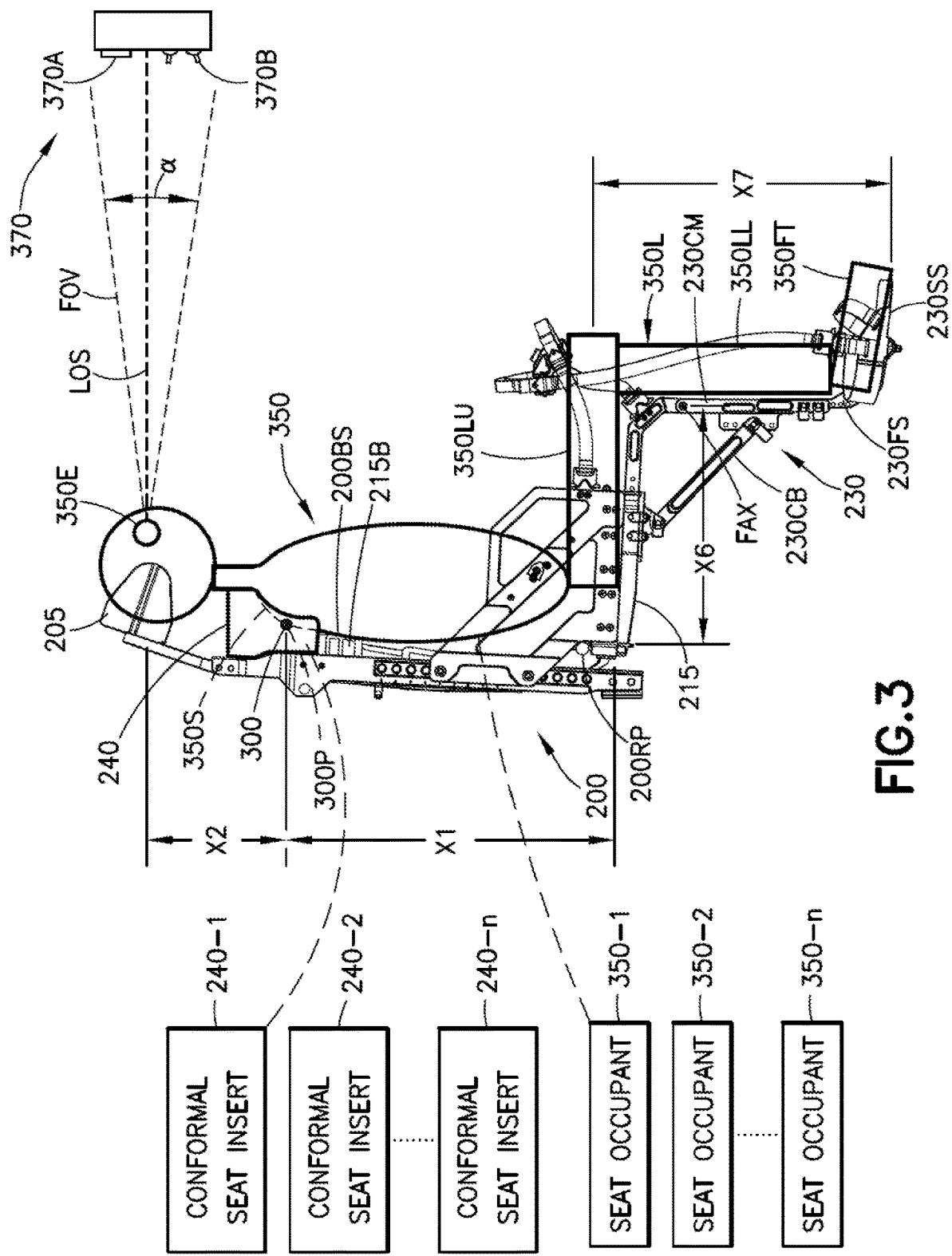
Figure 4:
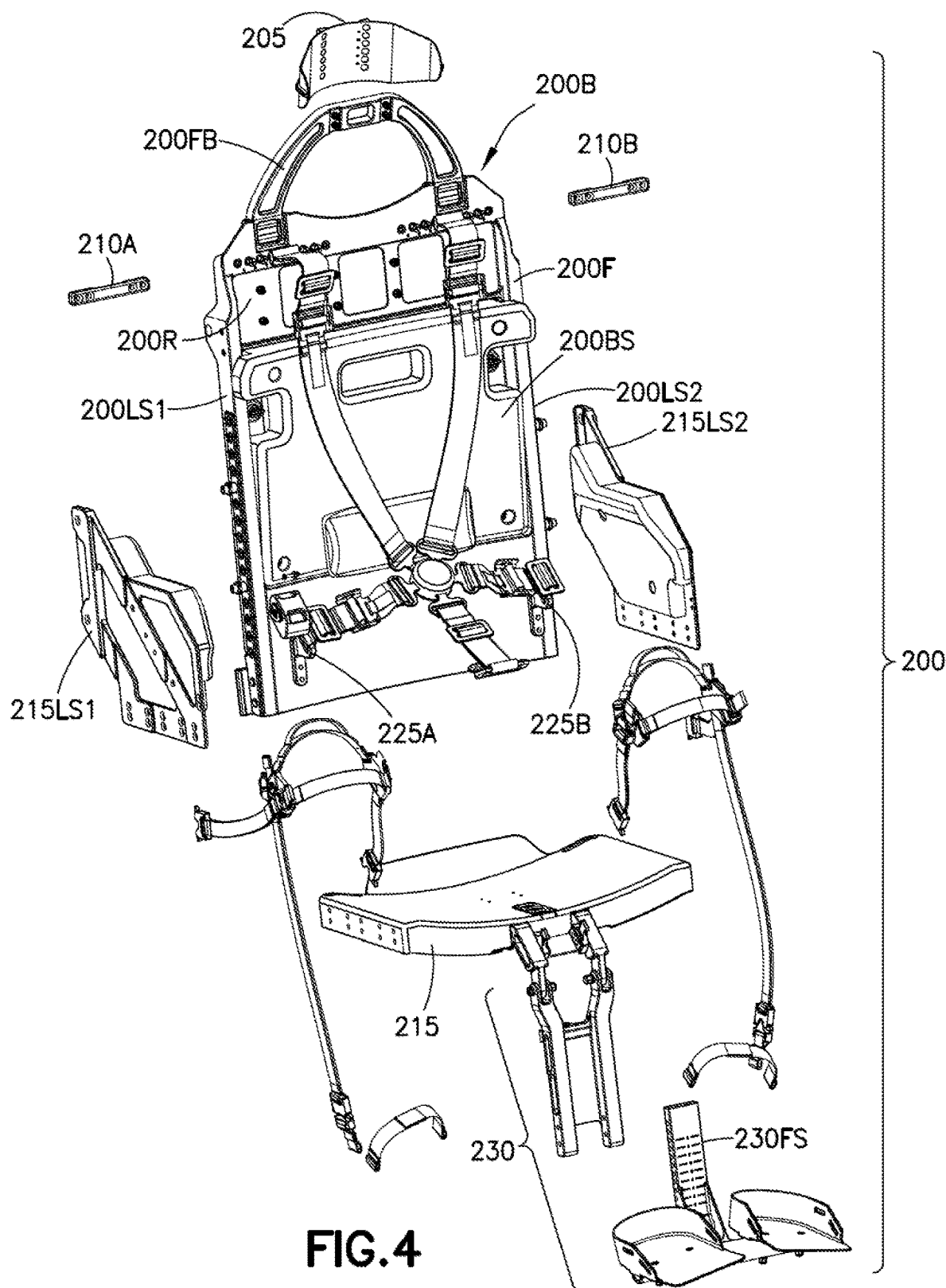
Figure 5:
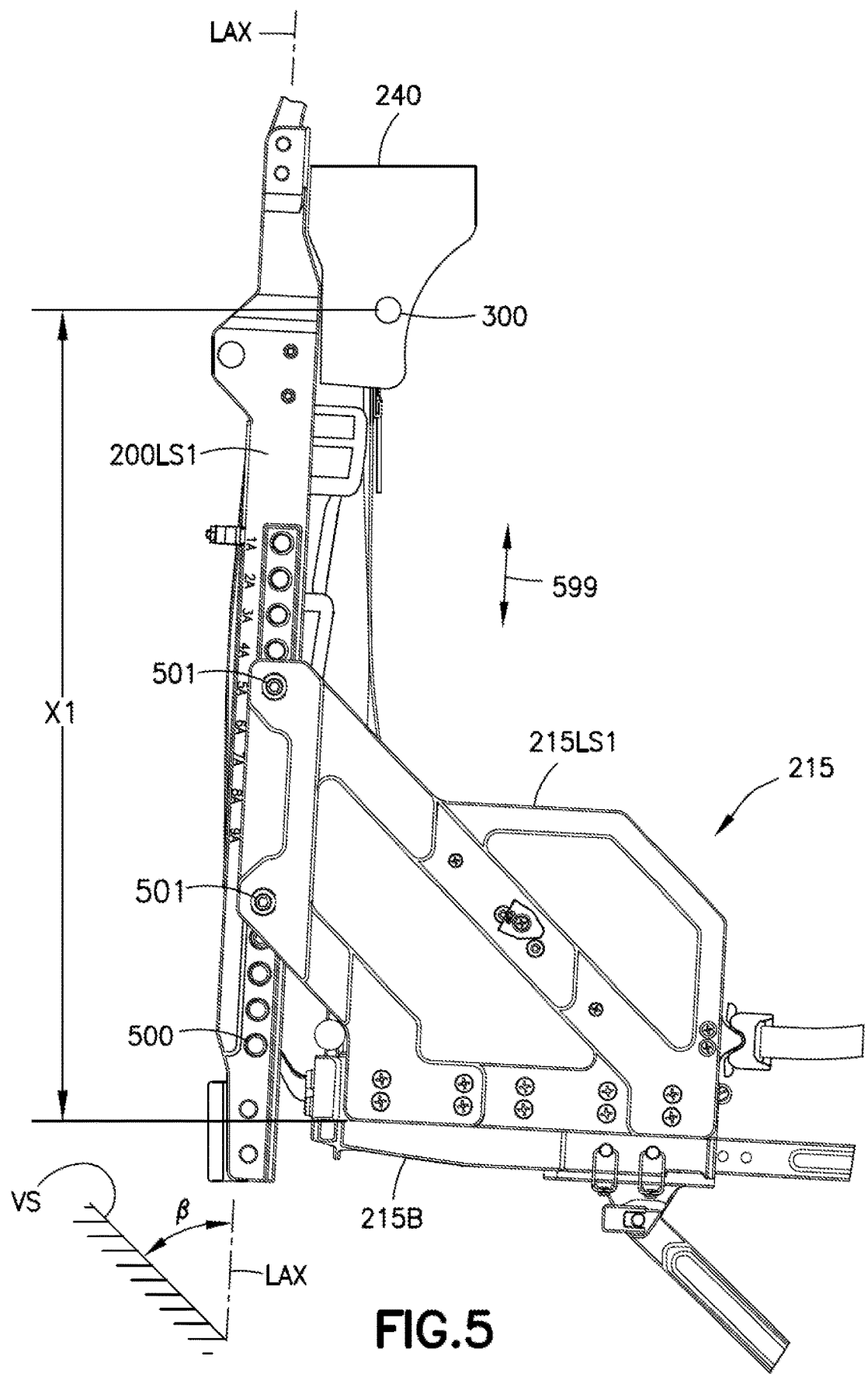
Figure 6A:
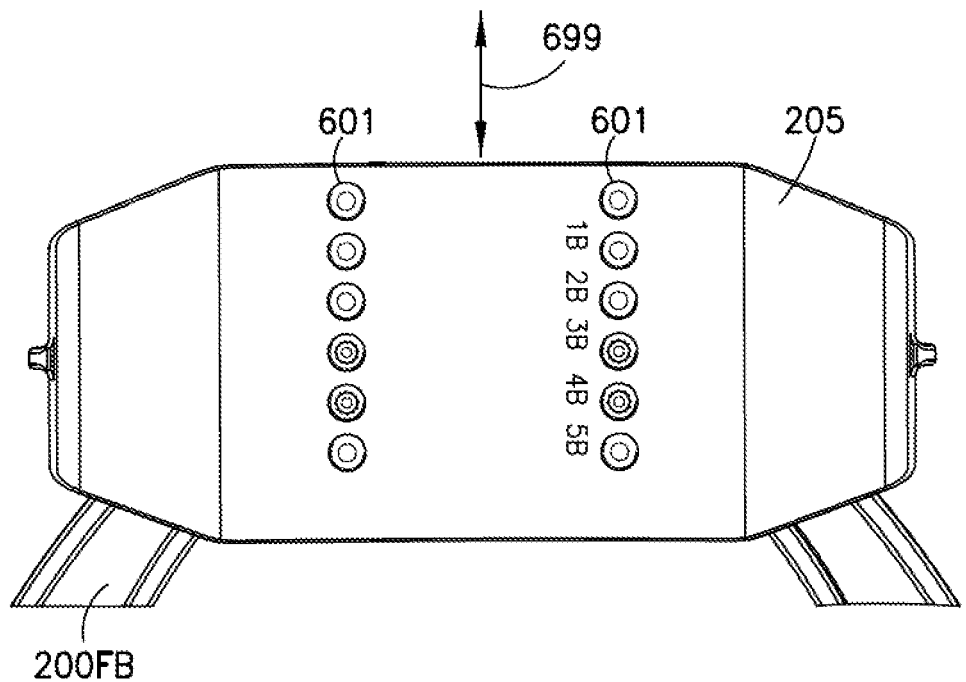
Figure 6B:
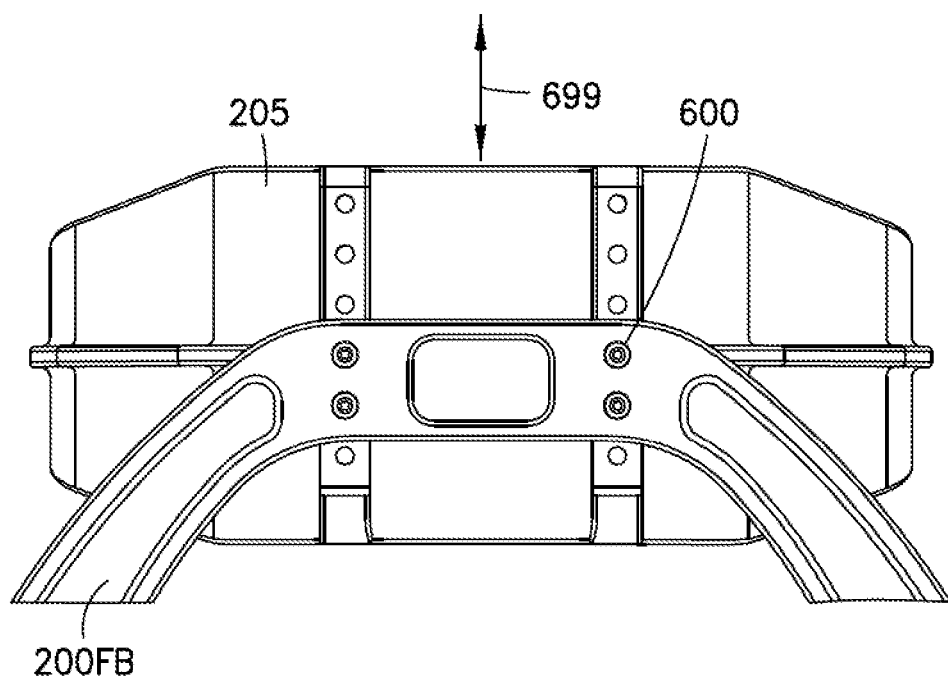
Figure 7:
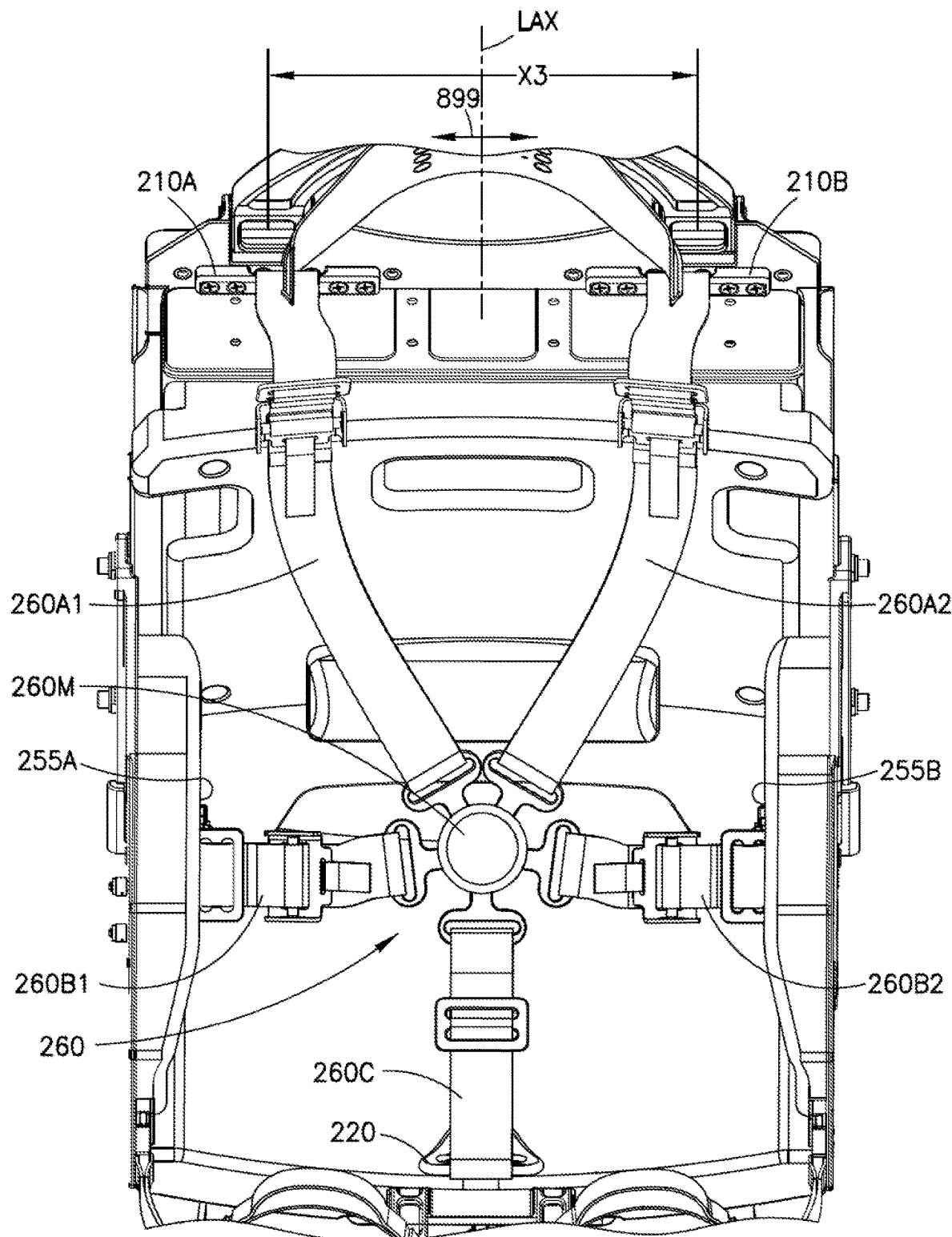
Figure 9A:
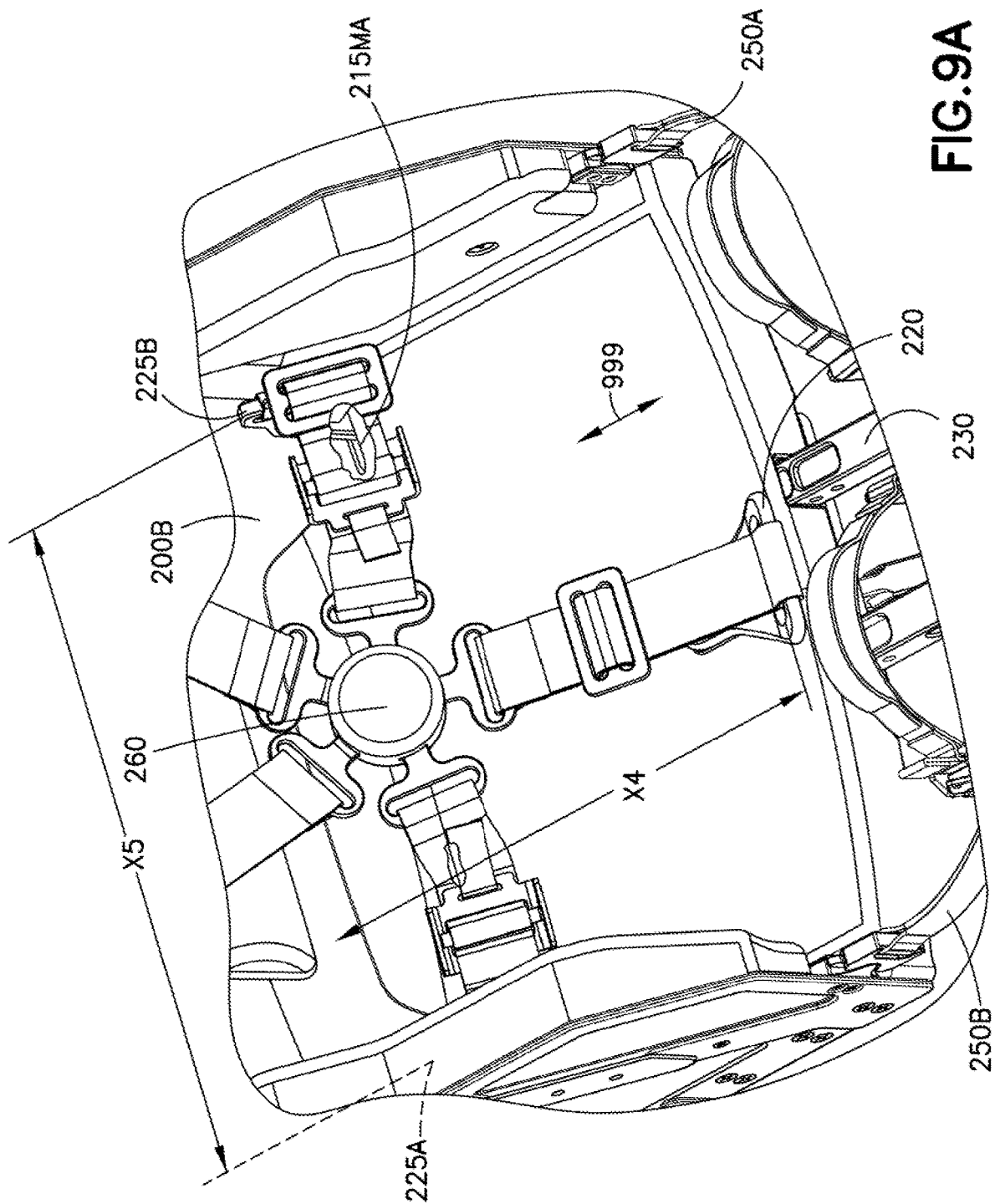
Figure 9B:
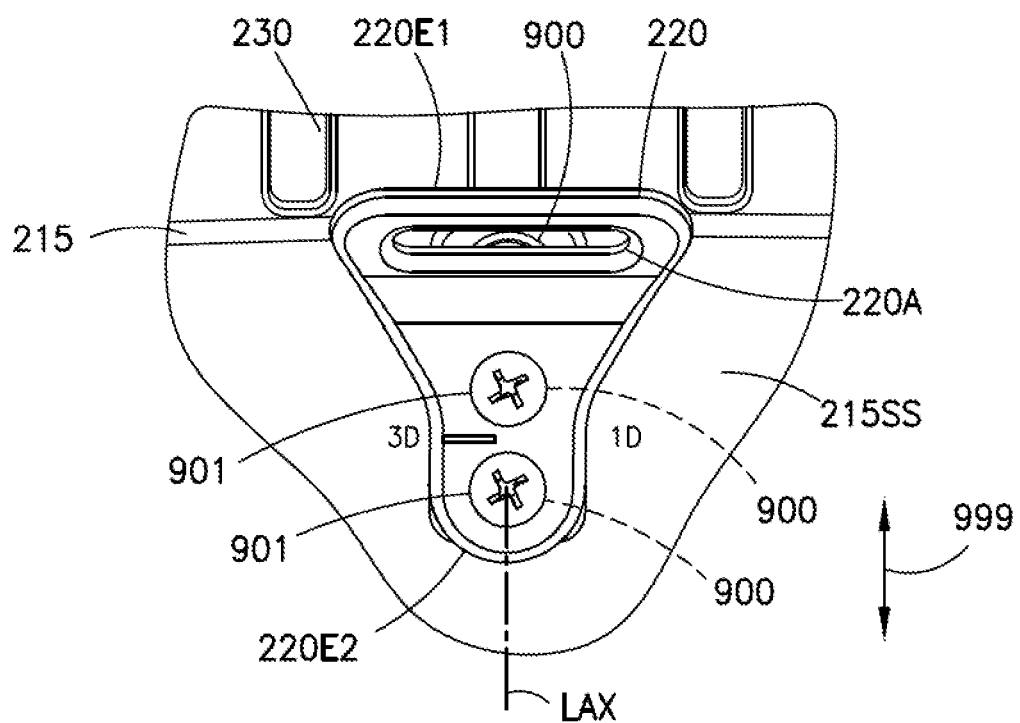
Figure 9C:
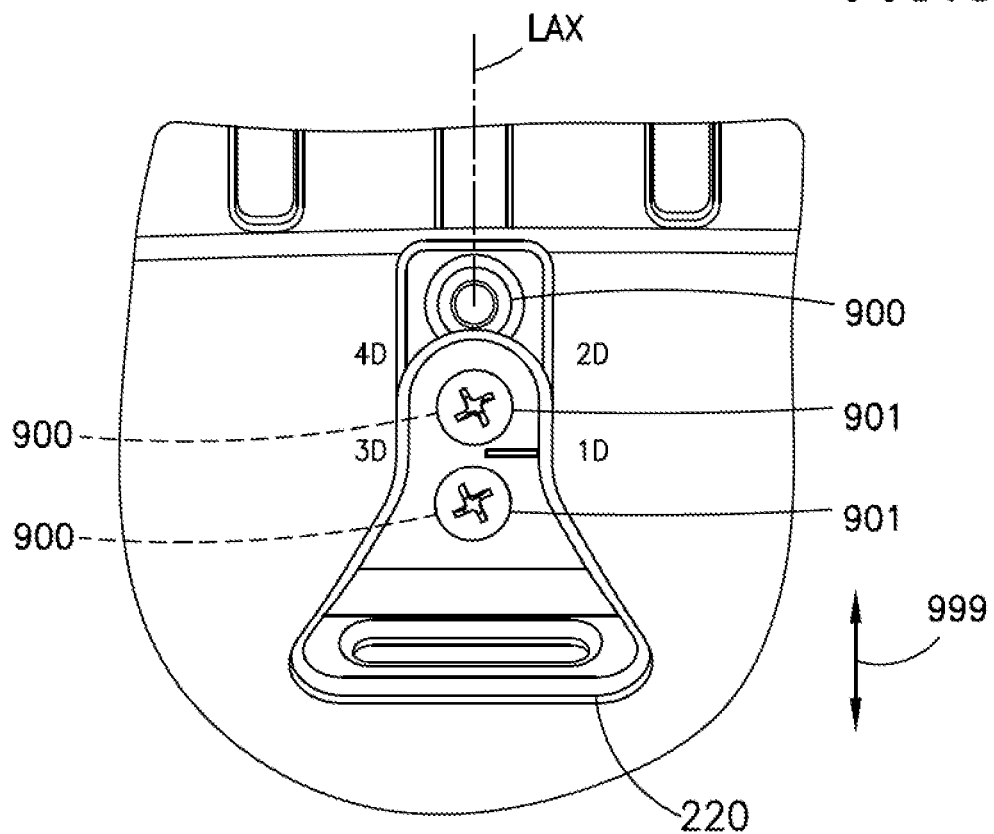
Figure 10A:
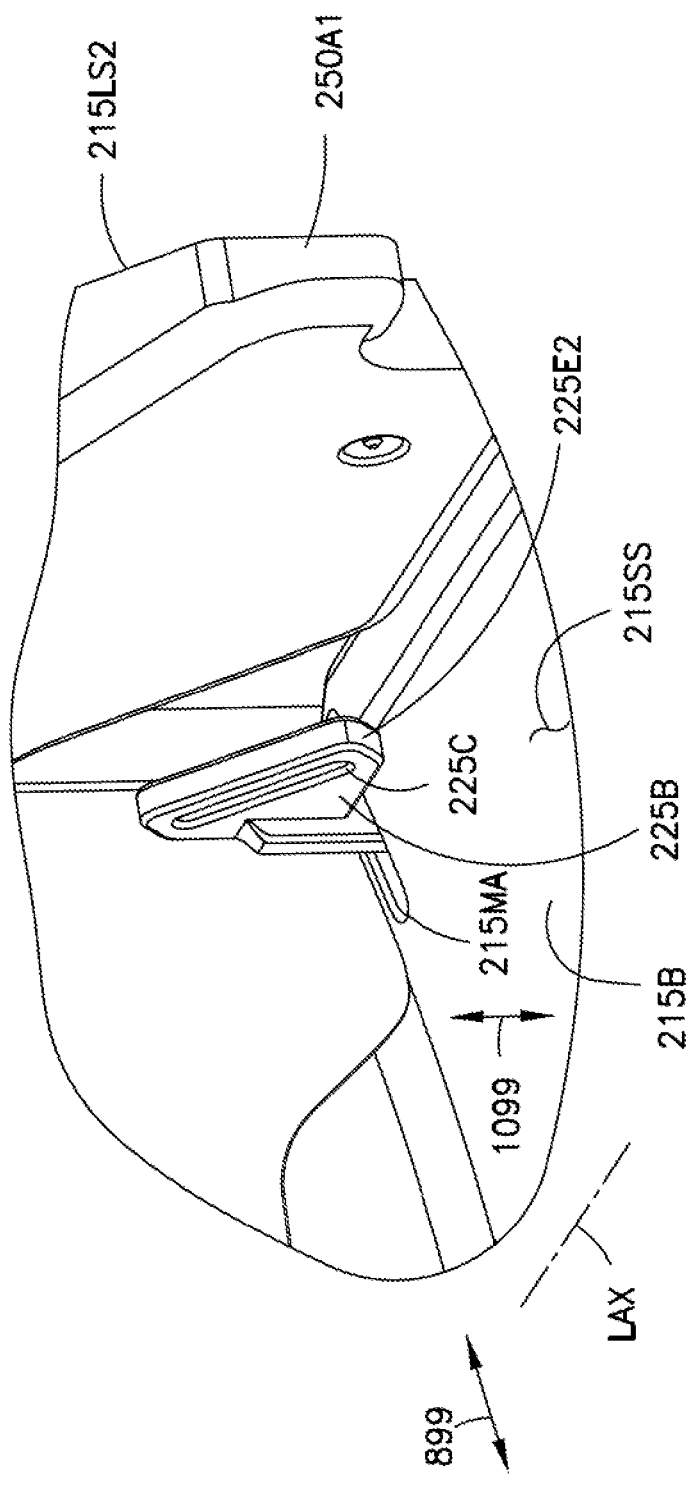
Figure 10B:
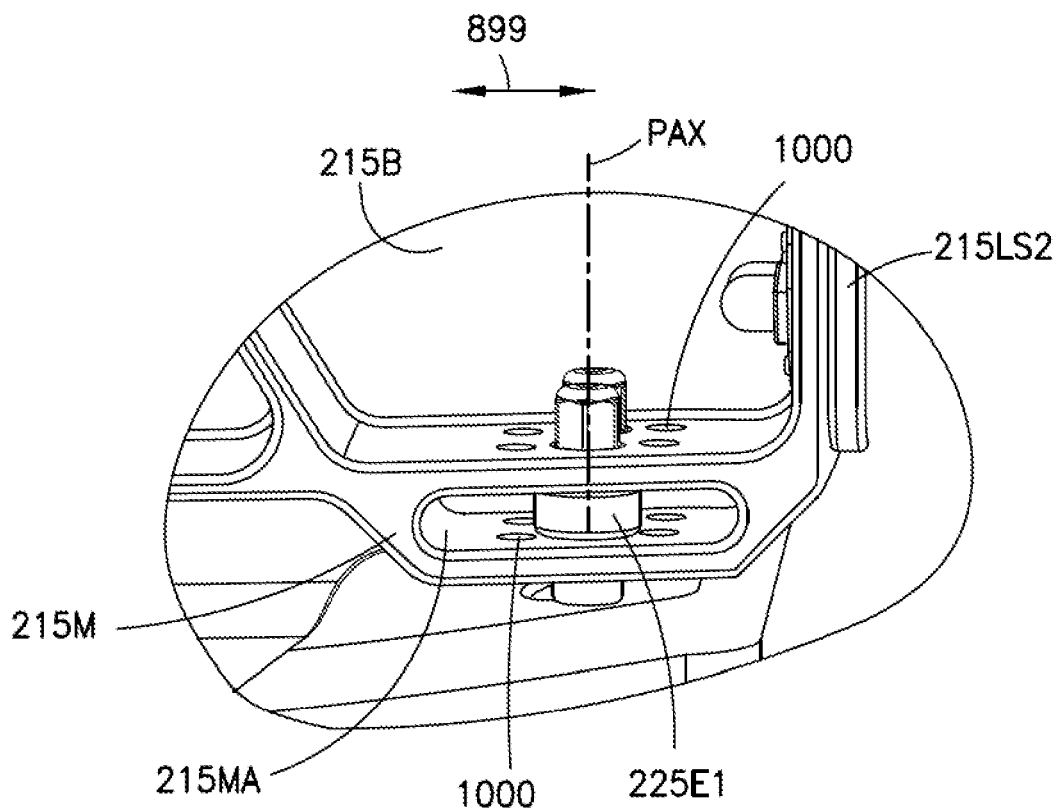
Figure 10C:
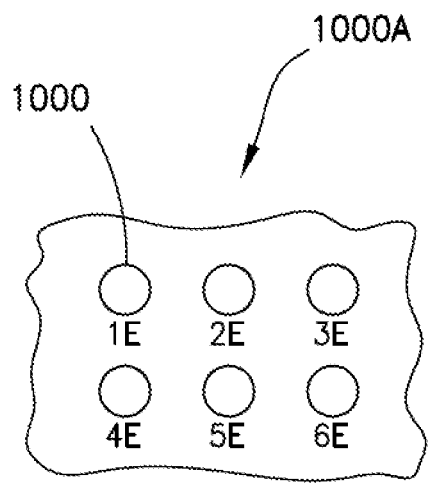
Figure 10D:
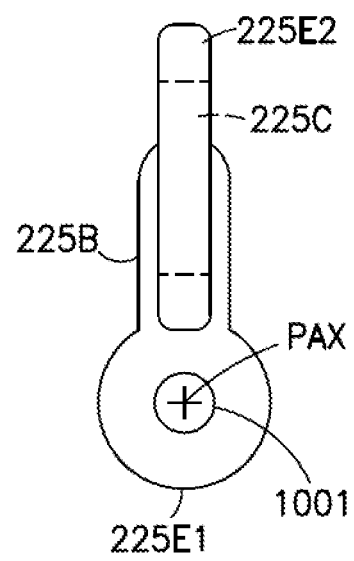
Figure 11B:
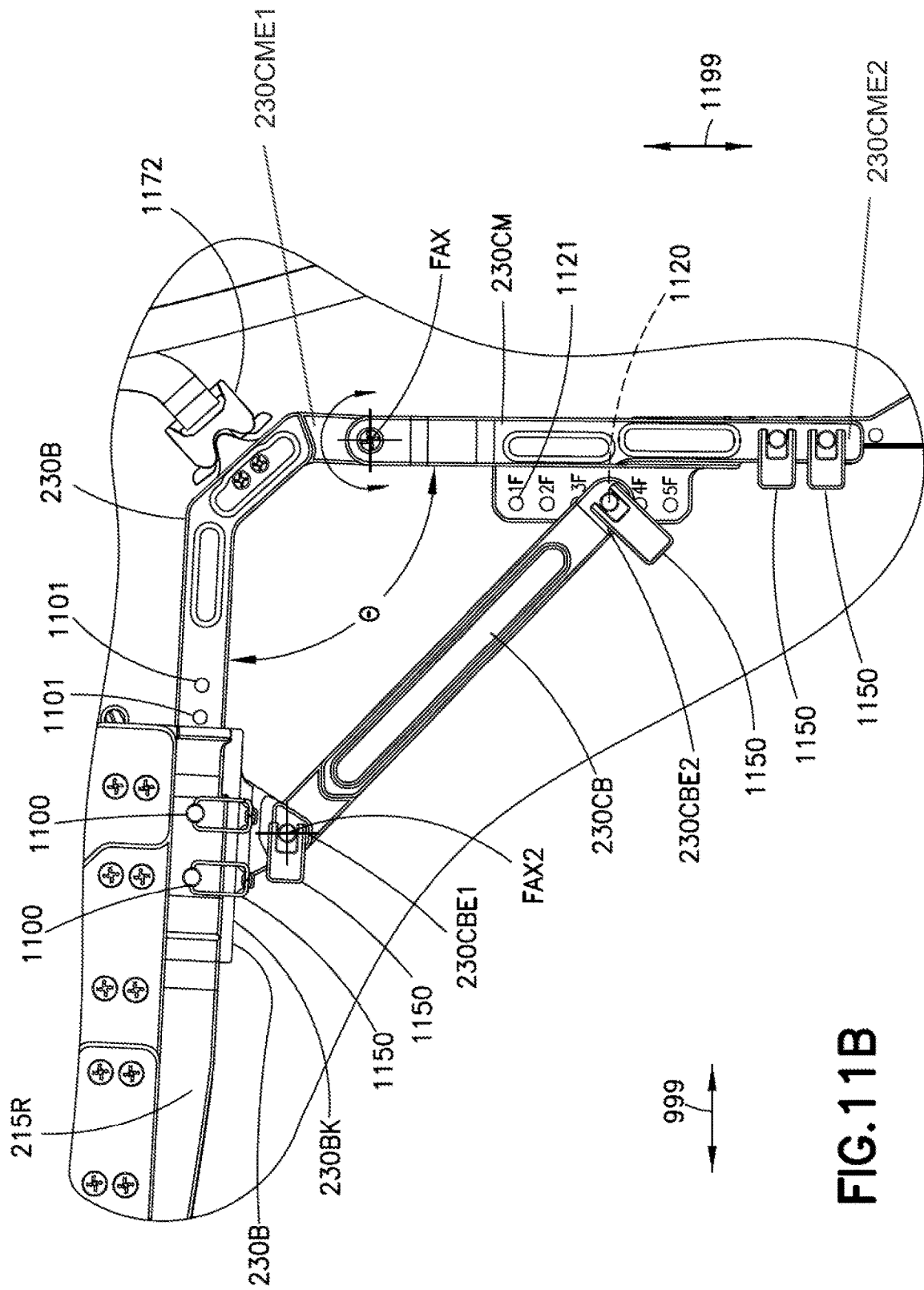
Figure 11C:
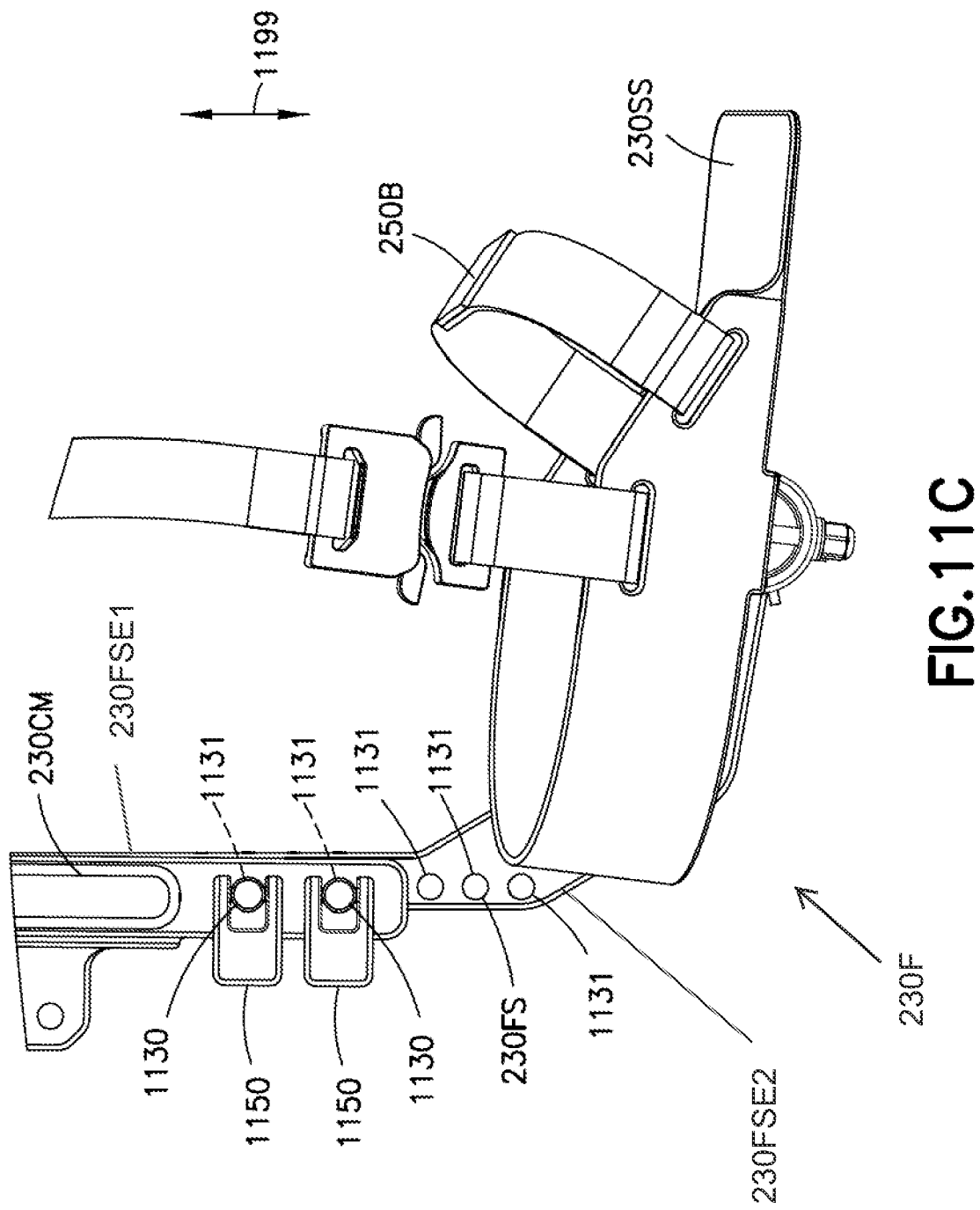
Figure 11D:
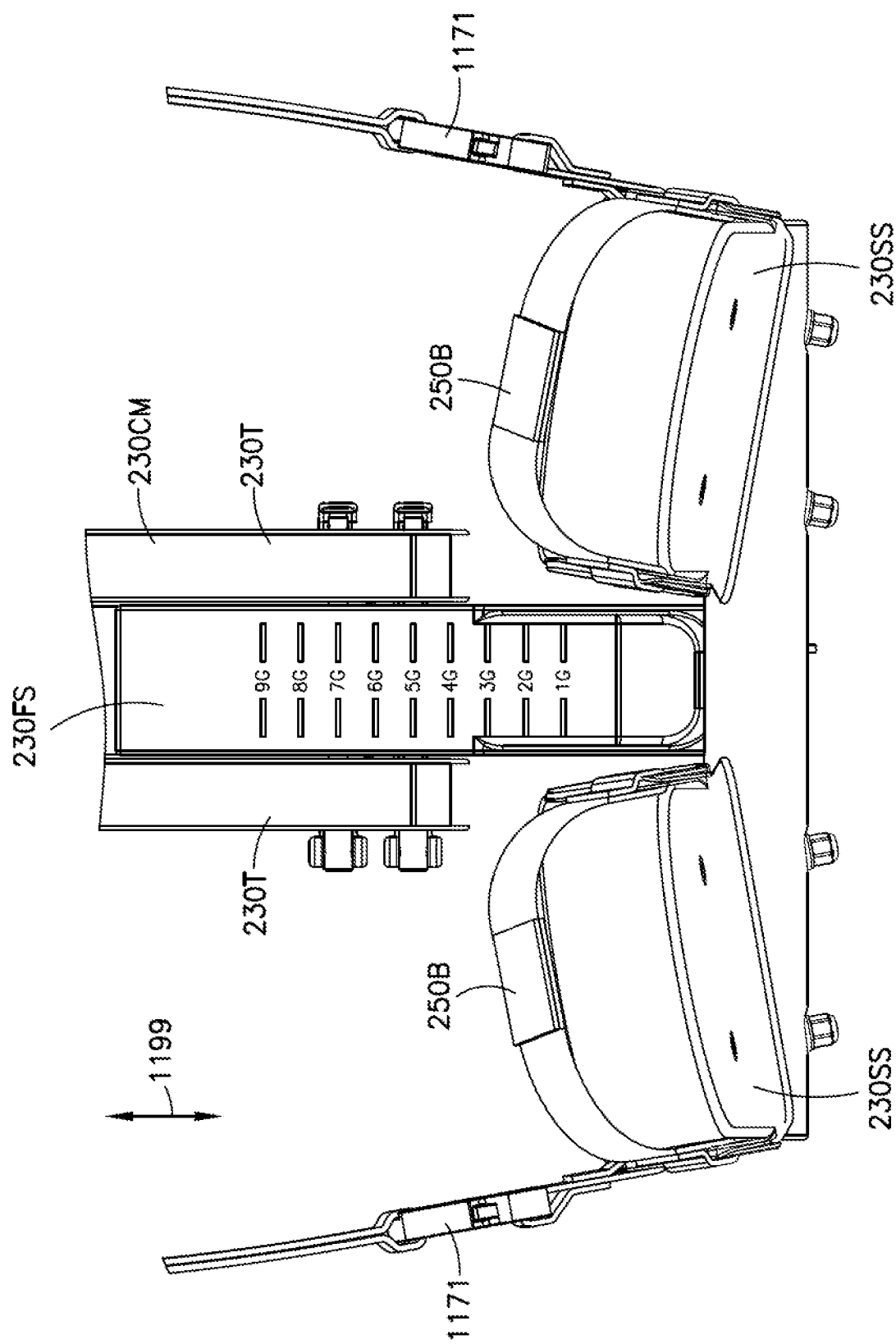
Figure 11E:
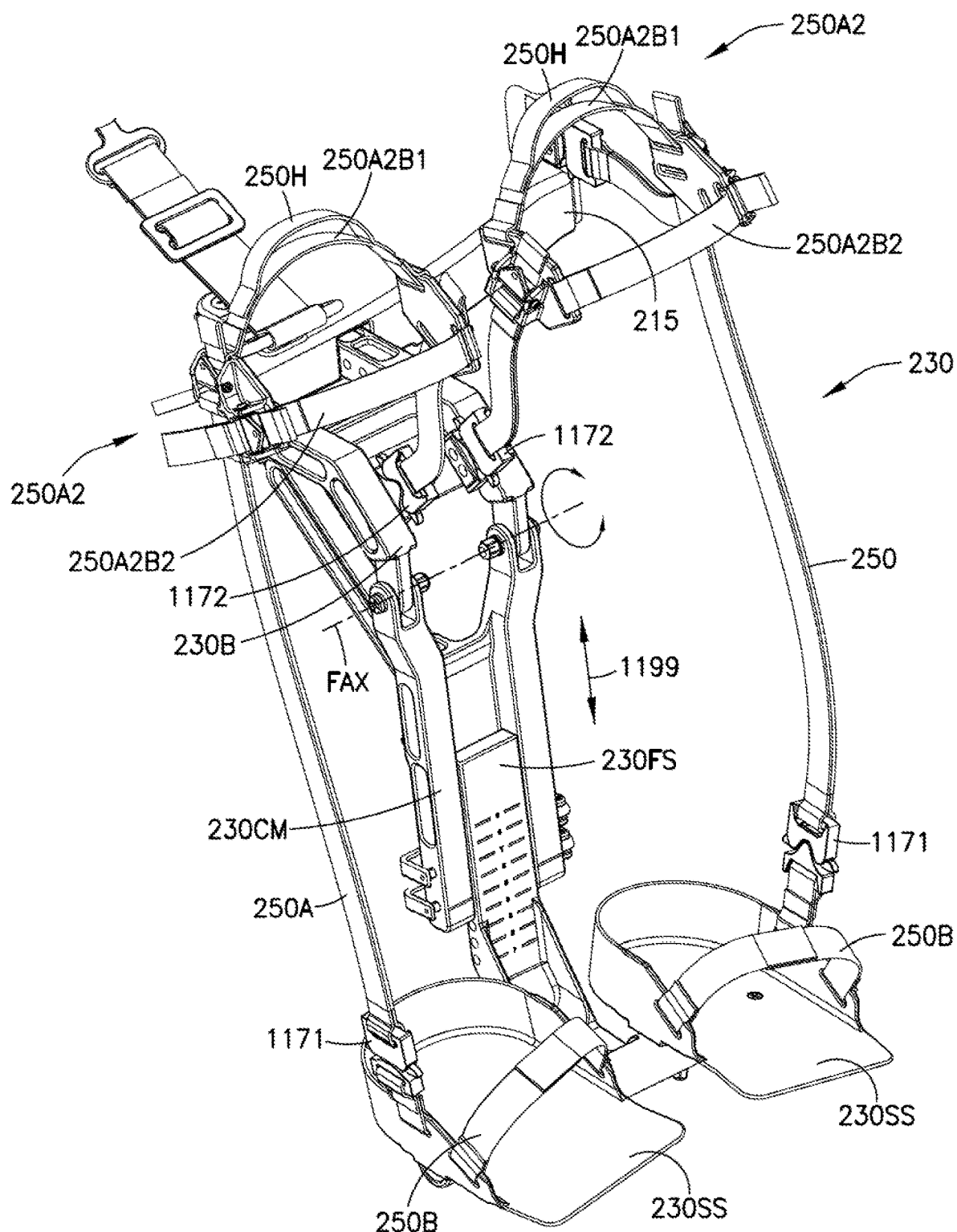
Figure 12A:
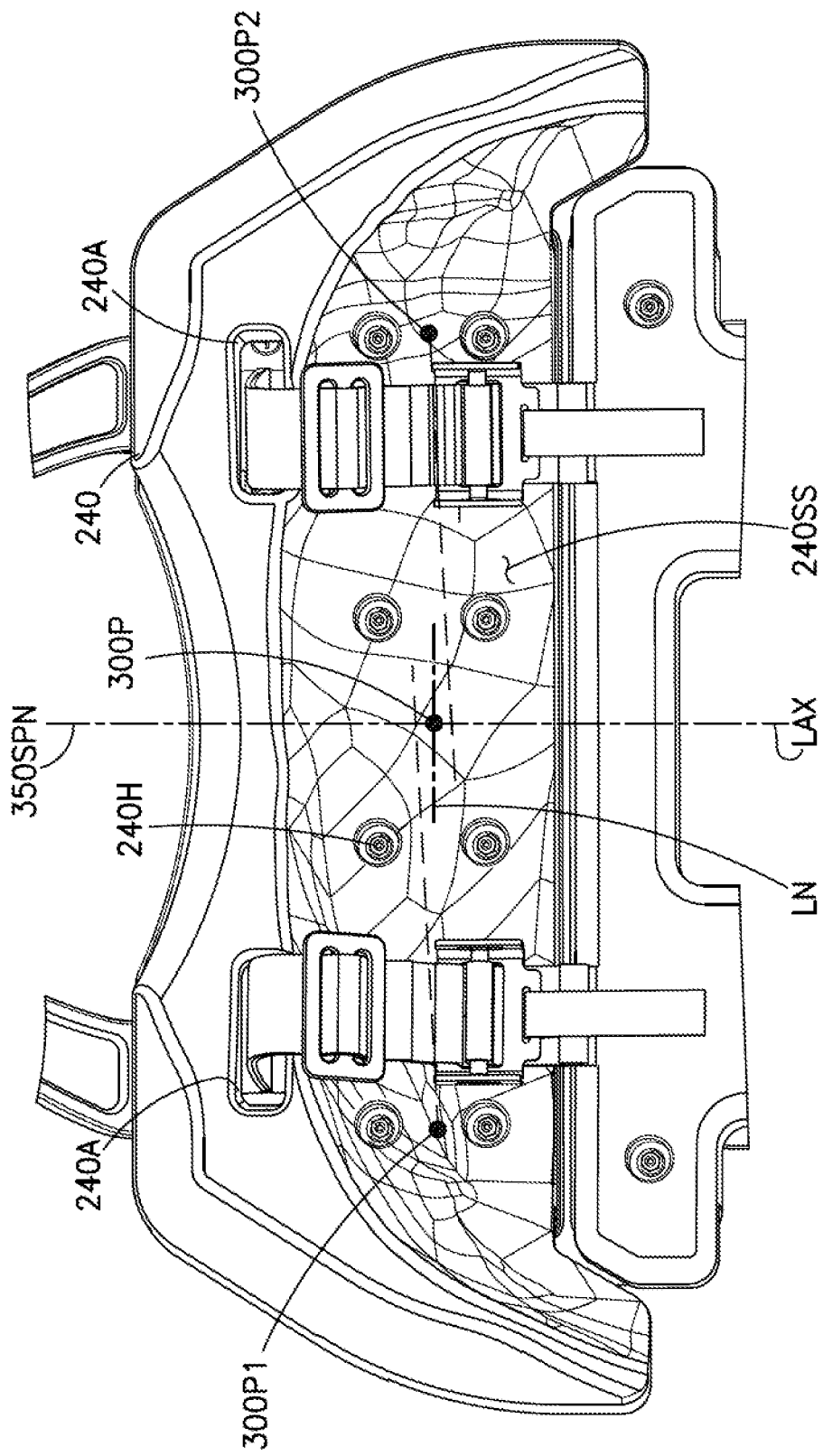
Figure 12B:
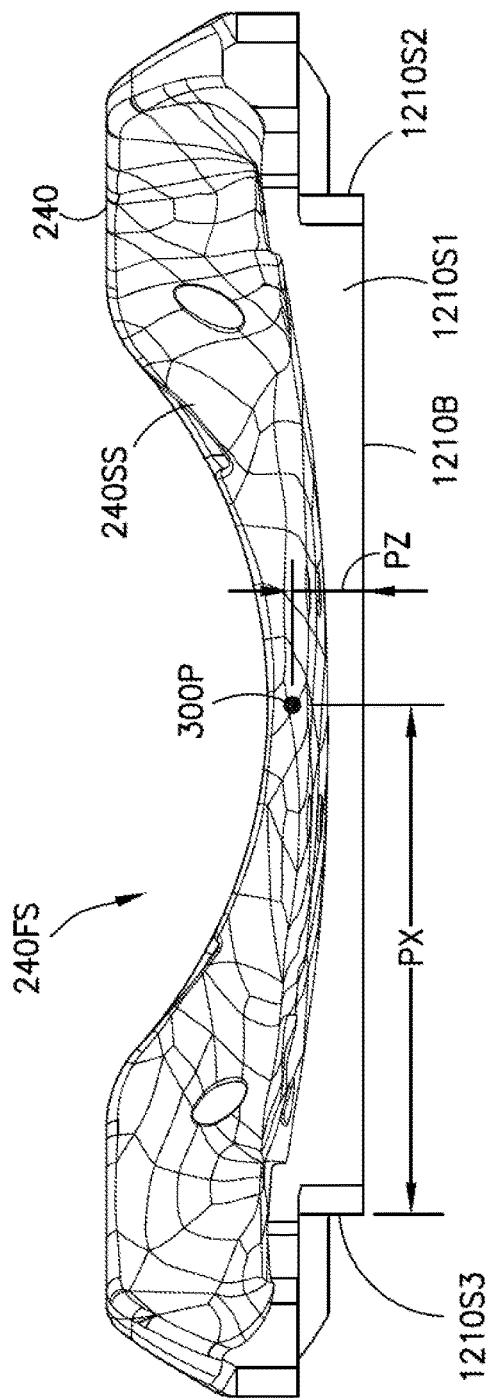
Figure 12C:
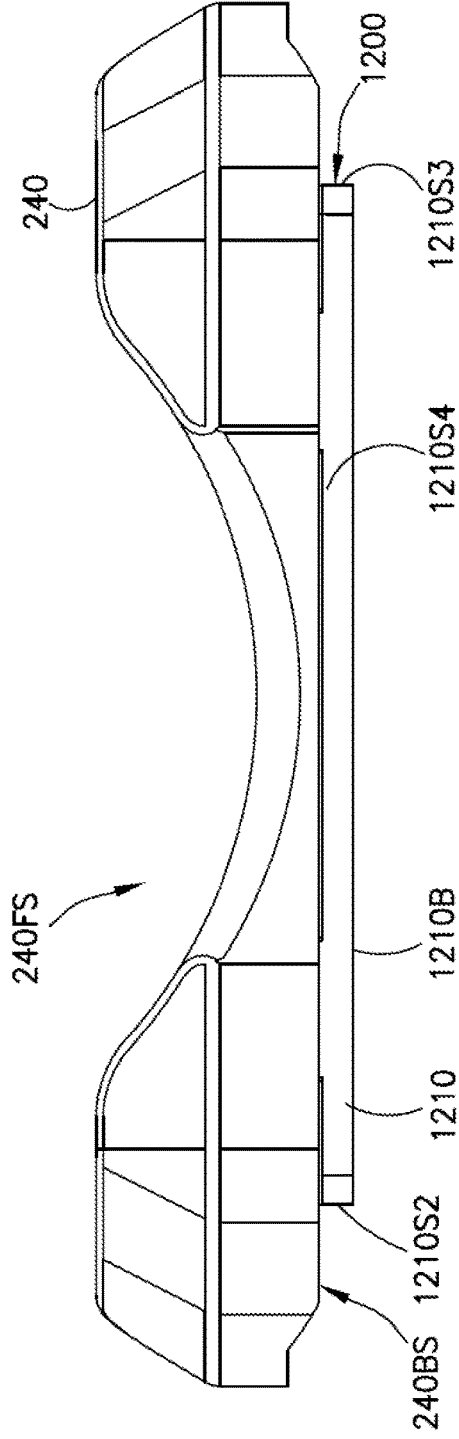
Figure 12E:
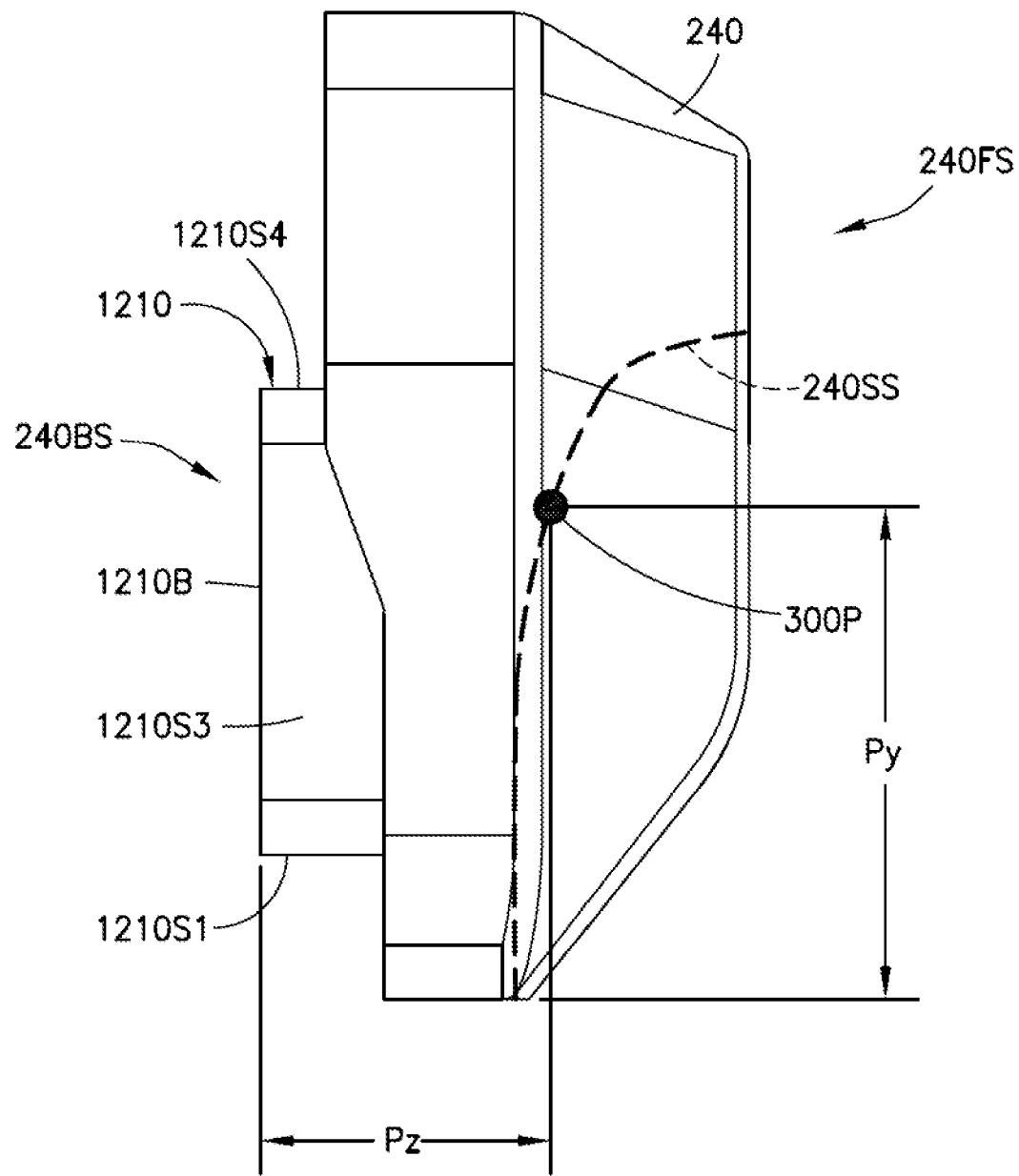
Figure 13:
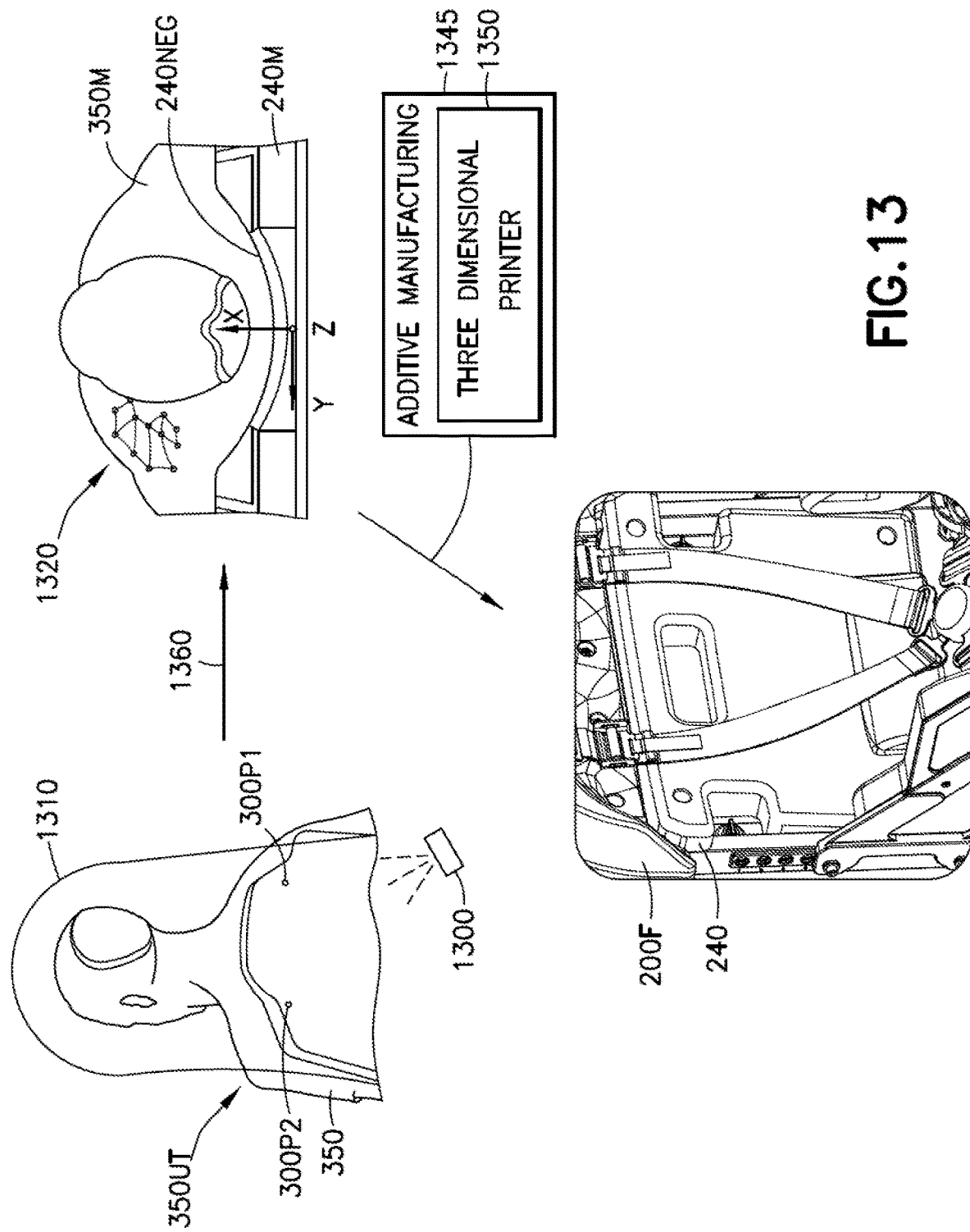
Figure 14:
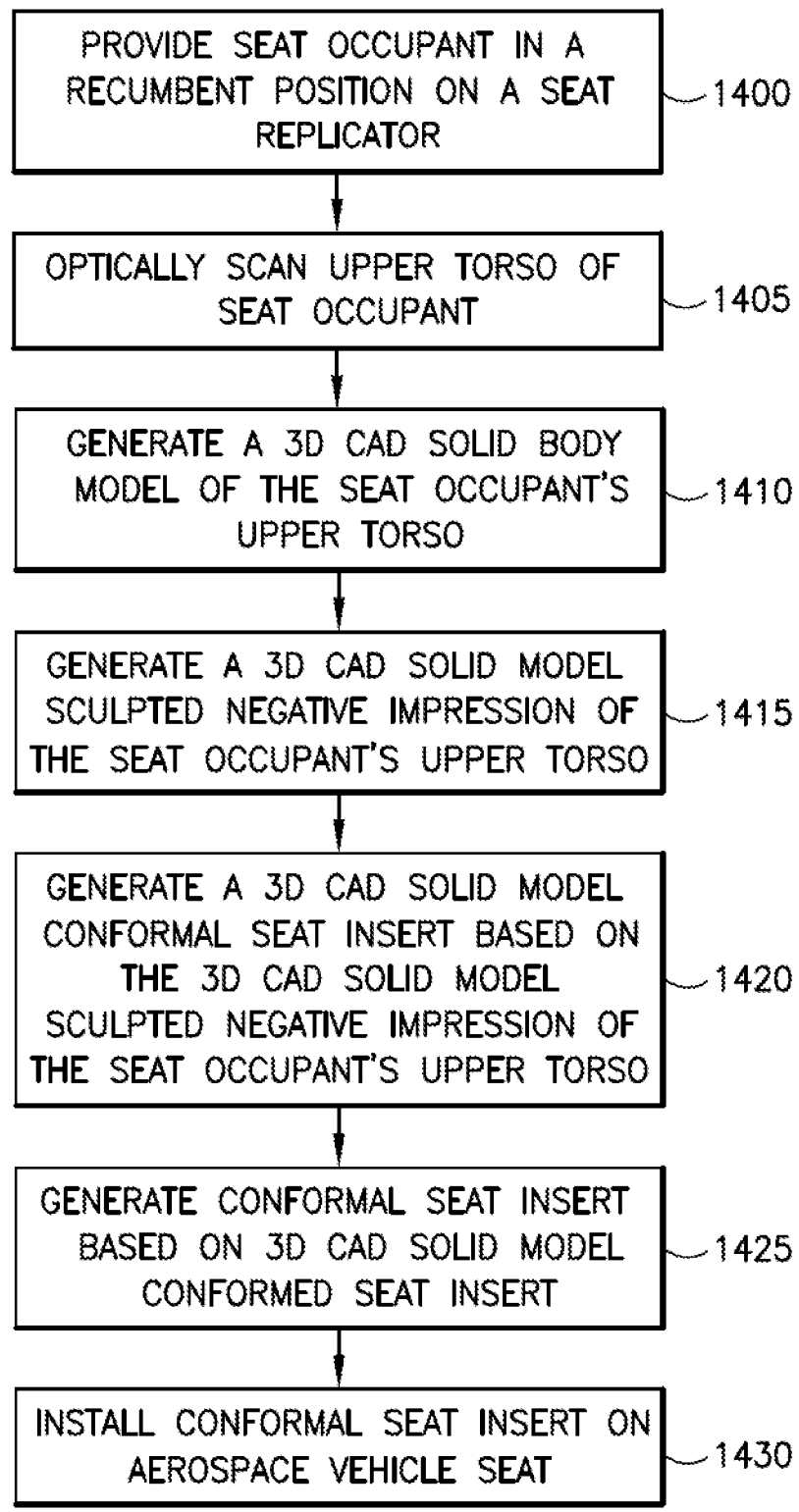
Figure 15:
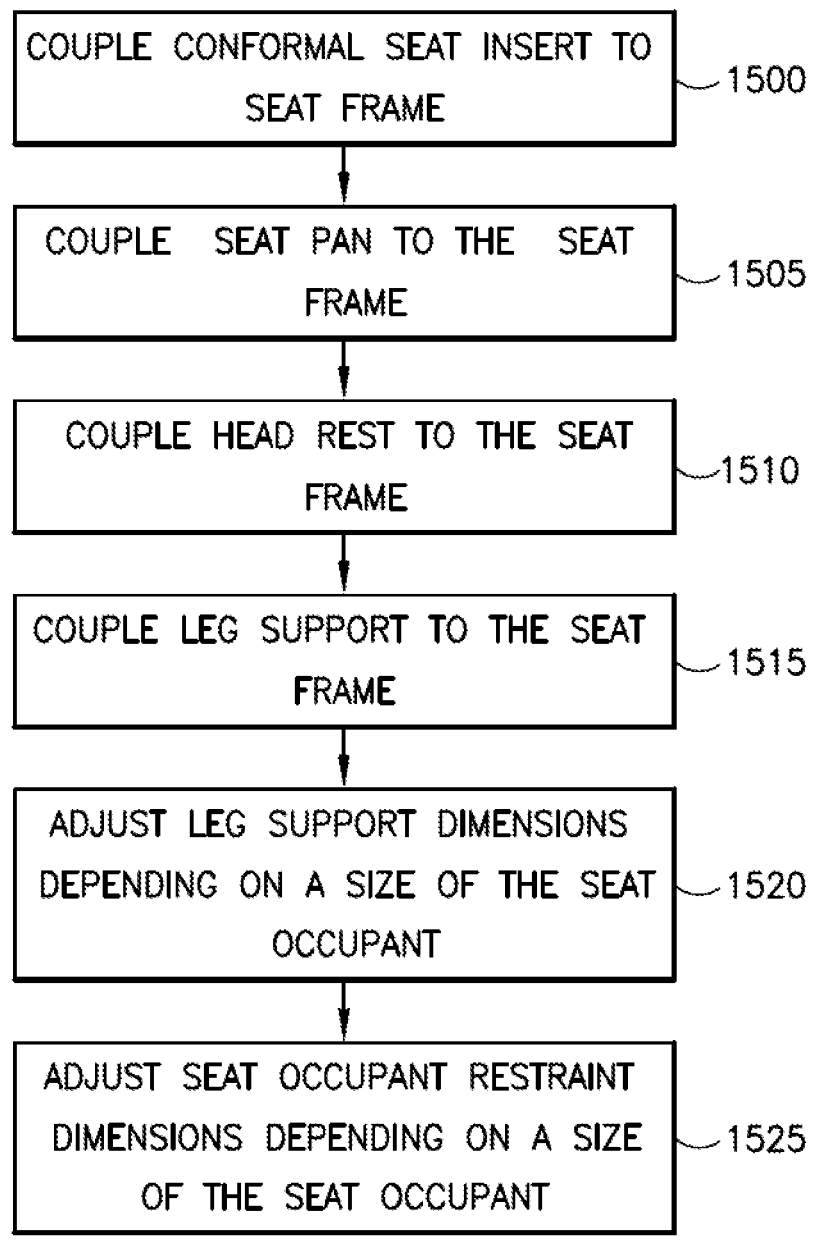

Having thus described examples of the present disclosure in general terms, reference will now be made to the accompanying drawings, which are not necessarily drawn to scale, and wherein like references characters designate the same or similar parts throughout the several views, and wherein:

FIG. 1 is a schematic illustration of an aerospace vehicle in accordance with aspects of the present disclosure;

FIG. 2 is a schematic isometric view of a vehicle seat in accordance with aspects of the present disclosure;

FIG. 3 is a schematic illustration of a side view of the vehicle seat in accordance with aspects of the present disclosure;

FIG. 4 is a schematic illustration of the vehicle seat in accordance with aspects of the present disclosure;

FIG. 5 is a schematic illustration of a set pan portion of the vehicle seat in accordance with aspects of the present disclosure;

FIG. 6A is a schematic illustration of a front view of a head rest portion of the vehicle seat in accordance with aspects of the present disclosure;

FIG. 6B is a schematic illustration of a back view of the head rest portion of the vehicle seat in accordance with aspects of the present disclosure;

FIG. 7 is a schematic front illustration of a portion of the vehicle seat in accordance with aspects of the present disclosure;

FIG. 8 is a schematic illustration of a portion of the vehicle seat in accordance with aspects of the present disclosure;

FIG. 9A is a schematic illustration of a portion of the vehicle seat in accordance with aspects of the present disclosure;

FIG. 9B is a schematic illustration of a portion of the vehicle seat in accordance with aspects of the present disclosure;

FIG. 9C is a schematic illustration of a portion of the vehicle seat in accordance with aspects of the present disclosure;

FIG. 10A is a schematic isometric view illustration of a portion of the vehicle seat in accordance with aspects of the present disclosure;

FIG. 10B is a schematic bottom view illustration of a portion of the vehicle seat in accordance with aspects of the present disclosure;

FIG. 10C is a schematic illustration of a portion of the vehicle seat in accordance with aspects of the present disclosure;

FIG. 10D is a schematic illustration of a portion of the vehicle seat in accordance with aspects of the present disclosure;

FIG. 10E is a schematic illustration of a portion of the vehicle seat in accordance with aspects of the present disclosure;

FIG. 10F is a schematic illustration of a portion of the vehicle seat in accordance with aspects of the present disclosure;

FIG. 11A is a schematic bottom view illustration of a portion of the vehicle seat in accordance with aspects of the present disclosure;

FIG. 11B is a schematic side view illustration of a portion of the vehicle seat in accordance with aspects of the present disclosure;

FIG. 11C is a schematic side view illustration of a portion of a leg support of the vehicle seat in accordance with aspects of the present disclosure;

FIG. 11D is a schematic front view illustration of a portion of the leg support of the vehicle seat in accordance with aspects of the present disclosure;

FIG. 11E is a schematic isometric view illustration of a portion of the vehicle seat in accordance with aspects of the present disclosure;

FIG. 12A is a schematic front view illustration of a conformal seat insert of the vehicle seat in accordance with aspects of the present disclosure;

FIG. 12B is a schematic bottom view illustration of the conformal seat insert of the vehicle seat in accordance with aspects of the present disclosure;

FIG. 12C is a schematic top view illustration of the conformal seat insert of the vehicle seat in accordance with aspects of the present disclosure;

FIG. 12D is a schematic illustration of the conformal seat inset of the vehicle seat in accordance with aspects of the present disclosure;

FIG. 12E is a schematic side view illustration of the conformal seat insert of the vehicle seat in accordance with aspects of the present disclosure;

FIG. 13 is a schematic series of illustrations showing generation of a conformal seat insert according to aspects of the present disclosure;

FIG. 14 is a flow diagram for generating a conformal seat insert according to aspects of the present disclosure; and FIG. 15 is a flow diagram for adjusting a vehicle seat according to aspects of the present disclosure.

DETAILED DESCRIPTION

Referring to FIGS. 1, 2 and 3, the aspects of the present disclosure may provide an adjustable and reconfigurable vehicle seat 200 for high g force applications. In one aspect, the high g forces may be, for example, up to about a 12 g force in a lateral direction, up to about negative 12 g force out of the seat, and up to about a 20 g force into the seat with a combined load of up to about 27 g, while in other aspects, the high g forces may be more or less than about 12 g force in a lateral direction, more or less than about negative 12 g force out of the seat, and more or less than about a 20 g force into the seat depending on, for example, a material and operational environment of the vehicle seat 200.

While the aspects of the present disclosure are described with respect to an aerospace vehicle 100, such as a space capsule, in, for example, the context of launch and landing applications it should be understood that the aspects of the present disclosure may be applied to any suitable aerospace vehicle, such as airplanes, and terrestrial vehicles, such a cars, boats, etc., in the context of any suitable loading on the seat and/or the seat occupant.

The aspects of the present disclosure provide a vehicle seat 200 that may place the eyes 350E of a seat occupant 350 relative to, for example, instrumentation 370, such as displays 370A and controls 370B (e.g. that are viewed and used to control the aerospace vehicle 100 during high g maneuvers, as noted above), of the aerospace vehicle 100 at a predetermined position that is substantially decoupled from a size of the seat occupant so that a variation in eye 350E position between different seat occupants 350, 350-1, 350-2, 350-n of the same vehicle seat 200 is greatly reduced. The aspects of the present disclosure position the eyes 350E of the seat occupant 350 so that the instrumentation 370 is within, for example, a predetermined field of view FOV, of the seat occupant 350. For example, during high g maneuvers motion of a head of the seat occupant 350 may be limited (e.g. head rotation may be limited). In limited head motion circumstances, the aspects of the present disclosure, place the eyes 350E of the seat occupant 350 so that the instrumentation 370 is within the field of view FOV having a vision cone of a, where in one aspect a is about 30° while in other aspects a is more or less than 30°. The aspects of the present disclosure also provide the seat occupant with tailored structural support. The aspects of the vehicle seat 200 of the present disclosure provide a seat that may accommodate, for example, from about the 5$^{th}$ to about the 95$^{th}$ percentile humans based on stature while also accommodating for the discrete anthropomorphic measurement unique to the seat occupant 350.

The aspects of the present disclosure provide a vehicle seat 200 for an aerospace vehicle 100; however as noted above the aspects of the present disclosure may be used to provide a seat for any suitable terrestrial (e.g. land or air) and/or extra-terrestrial vehicle. As described herein, the vehicle seat 200 includes numerous adjustable features including an adjustable head rest 205, adjustable shoulder harness brackets 210A, 210B, an adjustable seat pan 215, an adjustable anti-submarine bracket 220, adjustable lap harness brackets 225A, 225B, and an adjustable leg support 230. These adjustment features adapt the vehicle seat 200 to a seat occupant 350 where the reference point or datum point for adjustment of the seat is, for example, a crew reference point 300P on the vehicle seat 200 corresponding to, for example, the acromial point 300 of one or more of the seat occupant's shoulder(s) 350S. The adjustment features may also provide a single vehicle seat 200 that can be configured and re-configured for more than one seat occupant 350, 350-1, 350-2, 350-n depending on one or more anthropometric dimensions of the more than one seat occupant 350, 350-1, 350-2, 350-n.

Illustrative, non-exhaustive examples, which may or may not be claimed, of the subject matter according to the present disclosure are provided below.

Still referring to FIGS. 1, 2 and 3 as well as FIG. 4, as noted above, the vehicle seat 200 is described herein with respect to aerospace vehicle 100 for exemplary purposes only. The vehicle seat 200 may be disposed within a passenger cabin 110 of the aerospace vehicle 100. In one aspect, the vehicle seat 200 includes a seat frame 200F, a head rest 205, shoulder restraint brackets 210A, 210B, an anti-submarine bracket 220, lap harness brackets 225A, 225B, a leg support 230, a conformal seat insert 240, flail restraints 250 and any suitable harness system such as a five point harness 260 (where the flail restraints 250 and the five point harness 260 form a seat occupant restraint system).

The seat frame 200F forms a seat back 200B and is configured to couple with, for example, the frame 100F of the aerospace vehicle 100 in any suitable manner. In one aspect, the seat frame 200F is mounted within the aerospace vehicle 100 so that the longitudinal axis LAX of the seat frame 200F forms any suitable angle β with any suitable vehicle surface VS (See FIG. 5). In one aspect, the vehicle surface VS may be a surface of the vehicle on which the vehicle rests upon landing, a surface of the aerospace vehicle 100 that is arranged in a predetermined orientation with respect to takeoff or landing forces exerted on the vehicle, or any other surface of the vehicle. In one aspect, the angle β between the longitudinal axis LAX of the seat frame 200F and the vehicle surface VS is about any suitable angle that corresponds to a dominant force vector acting on the vehicle and/or seat occupant 350 so that the seat occupant is in a substantially recumbent orientation relative to, for example, takeoff and landing forces exerted on the aerospace vehicle 100 and or seat occupant 350. The seat frame 200F may be constructed of any suitable material or combination of materials, such as aluminum, steel, titanium, composites, etc., and be formed in any suitable manner, such as by machining a billet of material, casting, three dimensional printing, hydroforming, etc. In one aspect, the material from which the seat frame 200F (and the other components of the vehicle seat described herein) may be selected so that the material provides a predetermined strength, weight and stiffness that depends on the operational environment in which the seat will be used. In one aspect, the material of the vehicle seat 200 provides a stiffness that decouples natural frequency vibrations from the natural frequency vibration of the seat occupant 350 when under excitation (e.g. the frequency response modes of the vehicle seat 200 are separated from the frequency response modes of the seat occupant 350).

In one aspect, the seat pan 215 is coupled to the seat frame 200F in any suitable manner, where one or more of the seat frame 200F and the seat pan 215 is configured to couple the seat pan 215 to the seat frame in one of a plurality of positions 1A-9A relative to the seat frame 200F so that an eye position (e.g. line of sight LOS) of the seat occupant 350 relative to the instrumentation 370 within the aerospace vehicle 100 is substantially decoupled from a size of the seat occupant 350 and so that the eye 350E is positioned, e.g., within a predetermined field of view FOV of the instrumentation 370 that is common to all users of that same vehicle seat 200. In one aspect, referring also to FIG. 5, each lateral side 200LS1, 200LS2 of the seat frame 200F includes a plurality of apertures 500 arranged longitudinally along the seat frame 200F with any suitable spacing between adjacent apertures 500. In one aspect, the apertures 500 have a smooth bore (i.e. no threads) while in other aspects the apertures 500 are threaded apertures. The seat pan 215 includes a base 215B and lateral sides 215LS1, 215LS2 coupled to the base in any suitable manner so that the seat occupant 350 rests on the base 215B between the lateral sides 215LS1, 215LS2. Each lateral side 215L1, 215LS2 includes coupling apertures 501 that are spaced from each other so as to align with apertures 500 of the seat frame 200F. Any suitable fasteners may be used to couple the seat pan 215 to the seat frame 200F through the apertures 500 and coupling apertures 501. In one aspect, the seat pan 215 is coupled to the seat frame 200F with any suitable bolts. The plurality of apertures 500 on the lateral sides 200LS1, 200LS2 of the seat frame 200F provide for a variable distance X1 between a support surface 215SS of the seat pan 215, on which the seat occupant 350 sits, and the crew reference point 300P on the conformal seat insert 240 corresponding to the acromial point(s) 300 of the seat occupant 350. The variability in the distance X1 compensates for different torso lengths of different seat occupants 350, 350-1, 350-2, 350-n using the same vehicle seat 200 by providing variable positioning of the seat pan 215 in direction 599 so that the line of sight LOS for each user 350, 350-1, 350-2, 350-n using the vehicle seat 200 is in substantially the same position relative to the instrumentation 370 (e.g. the instrumentation 370 is positioned within the field of view FOV). In one aspect, the apertures 500 and coupling apertures 501 may provide the seat pan with nine positions (as indicated in FIG. 5 with the position references 1-9) while in other aspects more or less than nine positions may be provided.

In one aspect, a seat back support 200BS is coupled to the frame 200F at least partially above the seat pan 215. The seat back support 200BS may be sized and shaped to provide lumbar and other suitable support to the seat occupant 350. In one aspect, the seat back support 200BS may be sized and shaped to accommodate a space suit or other equipment worn by the seat occupant 350. In one aspect, the seat back support 200BS is coupled to the seat frame 200F so as to be removable so that the seat occupant 350 may access equipment or any other suitable items behind the vehicle seat 200. In one aspect, the seat frame 200F includes one or more apertures AP (see FIG. 2) through which the equipment or any other suitable items may be access when the seat back support 200BS is removed.

Referring to FIGS. 2, 3, 4, 6A and 6B, in one aspect, the seat frame 200F includes a head rest bracket 200FB that is coupled to or integrally formed with the seat frame 200F. The head rest bracket 200FB may be constructed of any suitable material, such as those materials described above, and be formed in any suitable manner, such as in the manners described above. The head rest 205 is coupled to the seat frame 200F in any suitable manner, such as to the head rest bracket 200FB, where one or more of the seat frame 200F and the head rest 205 is configured to couple the head rest 205 to the seat frame 200F in one of a plurality of positions 1B-5B relative to the seat frame 200F. In one aspect, the head rest bracket 200FB includes a plurality of apertures 600 and the head rest includes a plurality of corresponding coupling apertures 601. The coupling apertures 601 may be arranged in rows and spaced from one another so that a hole pattern of the coupling apertures 601 matches a hole pattern of the apertures 600 in the head rest bracket 200FB. The rows of coupling apertures 601 in the head rest 205 provide for a variable distance X2 between the head rest 205 and the crew reference point 300P on the conformal seat insert 240 corresponding to the acromial point 300 of the seat occupant 350. The variability in the distance X2 compensates for different neck lengths of different seat occupants 350, 350-1, 350-2, 350-n using the same vehicle seat 200 by providing variable positioning of the head rest 205 in direction 699. In one aspect, the head rest 205 is coupled to the head rest bracket 200FB with any suitable fasteners such as bolt, pins, etc. passing through aligned apertures 600 and coupling apertures 601. In one aspect, the apertures 600 and coupling apertures 601 may provide the head rest with five positions (as indicated in FIG. 6A with the position references 1-5) while in other aspects more or less than five positions may be provided. The head rest 205 may be constructed of any suitable material, such as those described above, in any suitable manner such as described above.

Referring to FIGS. 3, 4, 7 and 8, the shoulder harness brackets 210A, 210B are coupled to the seat frame 200F in any suitable manner, where one or more of the seat frame 200F and the shoulder harness brackets 210A, 210B is configured to couple each of the shoulder harness brackets 210A, 210B to the seat frame 200F in one of a plurality of positions 1C-3C relative to the seat frame 200F and each other. For example, the seat frame 200F includes a plurality of apertures 800 that are spaced from one another by a predetermined distance in direction 899. The plurality of apertures are disposed on an upper portion of the seat frame, adjacent a location of the shoulders 350S of the seat occupant 350. Each of the shoulder harness brackets 210A, 210B include corresponding coupling apertures 801, where the coupling apertures 801 are spaced from one another so that a hole pattern of the coupling apertures 801 matches a hole pattern of the apertures 800 of the seat frame 200F. The plurality of apertures 800 of the seat frame 200F provide for the variable positioning each shoulder harness bracket 210A, 210B in lateral direction 899 relative to, for example, a longitudinal centerline LAX of the seat frame 200F and to each other for adjusting a variable distance X3 between the shoulder harness brackets 210A, 210B to compensate for different shoulder widths of different seat occupants 350, 350-1, 350-2, 350-n occupying the same vehicle seat 200. In one aspect, each shoulder harness bracket 210A, 210B is coupled to the seat frame 200F with any suitable fasteners such as bolt, pins, etc. passing through aligned apertures 800 and coupling apertures 801. In one aspect, the apertures 800 and coupling apertures 801 may provide each shoulder harness bracket with three positions (as indicated in FIG. 8 with the position references 1C-3C) while in other aspects more or less than three positions may be provided. The shoulder harness brackets 210A, 210B may be constructed of any suitable material, such those described above, and be formed in any suitable manner, such as described above.

Referring to FIGS. 2, 3, 7, 9A, 9B and 9C, the anti-submarine bracket 220 is coupled to the seat frame 200F in any suitable manner, where one or more of the seat frame 200F and the anti-submarine bracket 220 is configured to couple the anti-submarine bracket 220 to the seat frame 200F in one of a plurality of positions 1D-4D relative to the seat frame 200F. For example, in one aspect, the anti-submarine bracket 220 is coupled to the seat frame 200F through the seat pan 215. In one aspect, the seat pan 215 includes a plurality of apertures 900 and the anti-submarine bracket includes corresponding coupling apertures 901. In this aspect, the apertures 900 are arranged along the longitudinal axis LAX of the seat frame and include a predetermined spacing between the apertures. The coupling apertures 901 are spaced from each other so as to have the same spacing between the coupling apertures 901 as the apertures 900. For exemplary purposes only, the plurality of apertures 900 may include three apertures 900 and the coupling apertures 901 may include two coupling apertures 901 so that the anti-submarine bracket 220 is provided with four positions (as indicated in FIGS. 9B and 9C with position references 1D-4D). In this aspect, the anti-submarine bracket 220 may be constructed of any suitable material, such as those described above, and be formed in any suitable manner, such as described above. In one aspect, the anti-submarine bracket 220 includes a first end 220E1 and a second end 220E2 longitudinally spaced from the first end 220E1. The first end 220E1 includes an aperture 220A through which a part (e.g. the anti-submarine belt 260C) of the five point harness 260 passes for coupling the anti-submarine belt 260C to the submarine bracket 200. The coupling apertures 901 are positioned on the submarine bracket 220 between the aperture 220A and the second end 220E2. The anti-submarine bracket 220 may be coupled to the seat pan 215 through the apertures 900 and coupling apertures 901 using any suitable fasteners such as bolts, pins, etc. The apertures 900 in the seat pan and the coupling apertures 901 in the anti-submarine bracket 220 provide for a variable distance X4 between the aperture 220A and the seat back 220B, where the variability in the distance X4 compensates for different crotch dimensions of different seat occupants 350, 350-1, 350-2, 350-n using the same vehicle seat 200 by providing variable positioning of the aperture 200A in direction 999. In one aspect, the anti-submarine bracket 220 may be rotatable so that the aperture 200A may be positioned by arranging the anti-submarine bracket 220 with the first end 220E1 facing away from the seat back 200B so that the aperture 200A is placed in a position in direction 999 corresponding to one of positions 3D and 4D; while in other aspects, the aperture 200A may be positioned by arranging the anti-submarine bracket 220 with the first end 220E1 facing towards the seat back 200B so that the aperture 200A is placed in a position in direction 999 corresponding to one of positions 1D and 2D. Here position 1D provides the smallest distance X4 while position 4D provides the largest distance X4 relative to the seat back 200B.

Referring to FIGS. 2, 9A, 10A, 10B, 10C 10D, 10E, and 10F, the lap harness bracket 225A, 225B is coupled to the seat frame 200F in any suitable manner, where one or more of the seat frame 200F and the lap harness brackets 225A, 225B is configured to couple the lap harness brackets 225A, 225B to the seat frame 200F in one of a plurality of positions 1E-6E relative to the seat frame 200F. For example, in one aspect, each lap harness bracket 225A, 225B is coupled to the seat frame 200F through the seat pan 215. In one aspect, the seat pan includes a lap harness bracket mount 215M adjacent to each lateral side 215LS1, 215LS2 of the seat pan 215. Each lap harness bracket mount 215M includes an aperture 215MA that extends through the seat pan 215. The lap harness bracket mount 215M includes a plurality of apertures 1000 arranged in an array 1000A, such as a two by three array, but in other aspects any suitable number of apertures 1000 may be provided so that the plurality of apertures 1000 form an array 1000A having any suitable size. The plurality of apertures 1000 provides, for example, six positions 1E-6E in which the lap harness brackets 225A, 225B may be placed. For example, the positions 1E-6E provide movement of each lap harness bracket 225A, 225B in direction 899 so that each lap harness bracket 225A, 225B may be moved towards and away from each other and the longitudinal centerline LAX of the seat frame 200F to adjust a variable lateral distance X5 between the lap harness brackets 225A, 225B. The positions 1E-6E also provide movement of each lap harness bracket 225A, 225B in direction 1099 so that the second end 225E2 of each lap harness bracket 225A, 225B may be moved towards and away from the support surface 215SS of the seat pan 215. The adjustment of the lap harness brackets 225A, 225B in direction 899 may accommodate different hip widths of different seat occupants 350, 350-1, 350-2, 350-$n$ using the same vehicle seat 200 and adjustment of the lap harness brackets 225A, 225B in direction 1099 may accommodate different waist sizes of different seat occupants 350, 350-1, 350-2, 350-$n$ using the same vehicle seat 200.

In one aspect, each lap harness bracket 225A, 225B includes a first end 225E1 and a second end 225E2. It is noted that lap harness bracket 225B is illustrated in FIG. 10D for illustrative purposes only but it should be understood that lap harness bracket 225A has the same configuration. The first end 225E1 is configured for insertion into the aperture 215MA of the lap harness bracket mount 215M and a coupling aperture 1001 is positioned adjacent the first end 225E1. The coupling aperture 1001 is aligned with one of the plurality of apertures 1000 so that each lap harness bracket 225A, 225B is pivotally coupled to the seat pan 215 about axis PAX. The pivotal coupling between each lap harness bracket 225A, 225B and the lap harness bracket mount 215M provides for rotation of each lap harness bracket 220 within the aperture 215MA to provide conformance of the lap belts 260B1, 260B2 of the five point harness 260 to the seat occupant 350. The second end 220E2 of the lap harness bracket 220 protrudes above the support surface 215SS of the seat pan 215 and includes an aperture 225C to which a respective one of the lap belts 260B1, 260B2 is coupled.

In one aspect, as illustrated in FIGS. 10E and 10F, each lap harness bracket 225A, 225B includes two coupling apertures 1001 positioned adjacent the first end 225E1. The two coupling apertures 1001 are aligned with a set 1000S1-1000S3 of the plurality of apertures 1000 so that each lap harness bracket 225A, 225B is fixedly coupled to the seat pan 215 (i.e., each lap harness bracket 225A, 225B will not rotate or pivot as described above). Each lap harness bracket 225A, 225B is movable between positions E1, E2, E3 corresponding to a respective set 1000S1-1000S3 of the plurality of apertures 1000 to provide movement of each lap harness bracket 225A, 225B in direction 899 as described above.

Referring to FIGS. 2, 3, 4, 11A, 11B, 11C, 11D and 11E, the leg support 230 is coupled to the seat frame 200F in any suitable manner, where one or more of the seat frame 200F and the leg support 230 is configured to couple the leg support 230 to the seat frame 200F in one of a plurality of positions 1F-6F, 1G-9G, 1H-5H relative to the seat frame 200F. In one aspect, a single leg support 230 is configured to provide support for both legs 350L of the seat occupant 350, while in other aspects each leg may have a respective leg support (e.g. a right leg support and a left leg support) substantially similar to the leg support 230 described herein but with a single foot rest on each leg support. In one aspect, the leg support 230 includes a leg support base 230B and a foot rest 230F, where one or more of the leg support base 230B and the foot rest 230F is configured to couple the foot rest 230F to the leg support base 230B in one of a plurality of positions relative to the leg support base. The leg support base 230B is coupled to the seat frame 200F in any suitable manner. For example, the leg support base 230B may be coupled to a bottom surface 215BS of the seat pan 215 so that the leg support 230 extends along the longitudinal axis LAX of the frame 200F and the legs 350L of the seat occupant 350 straddle the leg support 230. In one aspect the bottom surface 215BS of the seat pan 215 includes protrusions 215R that extend from the bottom surface 215B so as to form at least one channel through which the leg support base 230B extends. A plurality of apertures 1100 may extend transversely through the protrusions 215R. The leg support base 230B includes a plurality of coupling apertures 1101 that are configured to align with corresponding apertures 1100 of the protrusions 215R where the apertures 1100 and the coupling apertures 1101 have the same distance between adjacent apertures to provide movement of the leg support base 230B in direction 999 to adjust a variable distance X6 between a pivot axis FAX of the leg support base 230B and seat reference point 200RP (e.g. where the seat back 215B intersects the support surface 215SS of the seat pan 215—see FIGS. 2 and 3) to accommodate different upper leg 350LU lengths of different seat occupants 350, 350-1, 350-2, 350-$n$ using the same vehicle seat 200. The leg support base 230B may be coupled to the seat pan 215 using at least one hitch pin 1150 that passes through respective apertures 1100 and coupling apertures 1101 of the protrusions 215R and leg support base 230B. The hitch pins 1150 may provide for easy and rapid removal of the leg support 230 from the seat pan 215 for stowage of the leg support 230 and to provide more space within the aerospace vehicle 100, such as when the aerospace vehicle is in orbit.

In one aspect, the foot rest 230F includes a coupling member 230CM and foot support member 230FS. The coupling member 230CM includes a first end 230CME1 that is coupled to the leg support base 230B about pivot axis FAX in any suitable manner, such as with pins, bolts, etc. Here the leg support 230 includes a cross brace 230CB. A first end 230CBE1 of the cross brace 230CB is pivotally coupled to the seat pan 215 about axis FAX2 in any suitable manner, such as with any suitable bracket 230BK. In one aspect, the bracket 230BK may be mounted to the seat pan 215 in any suitable manner (such as with any suitable fasteners, e.g., screws, bolts, pins, etc.) so as to retain the leg support base 230B within the channel(s) formed by the protrusions 215R. The first end 230CBE1 of the cross brace 230CB may be pivotally coupled to the bracket 230BK about the axis FAX2 with a hitch pin 1150 or any other suitable fastener.

The second end 230CBE2 of the cross brace 230CB is coupled to the coupling member 230CM at one of a plurality of positions 1F-6F between the first end 230CME1 and a second end 230CME2 of the coupling member 230CM. For example, the coupling member 230CM includes a plurality of coupling apertures 1121 arranged in a row along the coupling member 230CM. The second end 230CBE2 of the cross brace includes an aperture 1120 that aligns with one of the plurality of coupling apertures 1121 for coupling the second end 230CBE2 of the cross brace with the coupling member 230CM at one of the positions 1F-6F in any suitable manner, such as with a hitch pin or any other suitable fastener. For example, positioning the second end 230CBE2 of the cross brace 230CB at position 1F provides a larger angle θ between the coupling member 230CM and the leg support base 230B than when the second end 230CBE2 of the cross brace 230CB is positioned at position 6F. Increasing and decreasing the angle θ by positioning the second end 230CBE2 of the cross brace 230CB at one of positions 1F-6F provides for an angular adjustment between the upper leg 350LU and lower leg 350LL at the knee joint of the seat occupant 350 so that the leg support 230 controls an angle between the upper leg 350LU and a lower leg 350LL of the seat occupant 350.

In one aspect, the second end 230CME2 of the coupling member 230CM has a forked configuration so that the foot support member 230FS is disposed between tines 230T of the fork. The foot support member 230FS includes a first end 230FSE1 that is disposed between the tines 230T. The foot support member 230FS includes a plurality of coupling apertures 1131 that are spaced apart from each other along the foot support member 230FS. The tines 230T of the coupling member 230CM include apertures 1130 that have the same spacing as the coupling apertures 1131 so as to align with the coupling apertures 1131. Any suitable fasteners, such as hitch pins 1150, bolts, etc., may be inserted through the apertures 1130 and the coupling apertures 1131 for positioning the foot support member 230FS at one of a plurality of positions 1G-9G relative to the seat pan 215 and the coupling member 230CM. The second end 230FSE2 of the foot support member 230FS includes at least one foot support surface 230SS where the at least one foot support surface supports both feet 350FT of the seat occupant 350 (e.g. the foot rest 230F is configured to support both feet 350FT of the seat occupant 350). In one aspect, the plurality of coupling apertures 1131 and the apertures 1130 provide for movement of the at least one foot support surface 230SS in direction 1199 for adjusting a variable distance X7 (see FIG. 3) between, for example, the foot support surface 230SS and the seat reference point 200RP or the seat pan 215 to accommodate for different lower leg 350LL lengths of different seat occupants 350, 350-1, 350-2, 350-n using the same vehicle seat 200.

In one aspect, the flail restraints 250 of the vehicle seat 200 may be coupled to one or more of the seat frame 200F, the seat pan 215 and the leg support 230. For example, in one aspect, a thigh restraint 250A1 may be coupled to each lateral side 215LS1, 215LS2 of the seat pan. The thigh flail restraints 250A1 may be sized and shaped so that the legs of the seat occupant are prevented from lifting or laterally moving out of the seat pan 215. In one aspect, the leg support 230 includes leg flail restraints 250A (e.g. one leg restraint for each leg of the seat occupant 350) that are releasably coupled to the foot support member 230FS adjacent to the at least one foot support surface 230SS with a respective releasable coupling member 1171, releasably coupled to the leg support base 230B adjacent the axis FAX with a respective releasable coupling member 1172, and releasably coupled to respective lateral sides 215LS1, 215LS2 of the seat pan 215 with a respective releasable coupling member 1173. In one aspect, a portion of the leg flail restraints 250A form knee flail restraints 250A2 where each knee flail restraint 250A2 includes a belt 250A2B1 that is disposed above the seat occupant's knee joint and a belt 250A2B2 that is disposed below the seat occupant's knee joint so that the seat occupant's legs 350L are securely held by the respective leg flail restraint 250A. In one aspect, one of the belts 250A2B1, 250A2B2 of each leg flail restraint 250A includes a handle 250H (seen best in FIG. 11E) configured so the seat occupant 350 can grab the handle 250H with a respective hand. In one aspect, the 230F of the leg support 230 includes foot flail restraints 250B that are form loops coupled to the at least one foot support surface 230SS for each foot 350FT of the seat occupant 350.

Referring to FIGS. 7, 9 and 10A, in one aspect, the vehicle seat 200 includes the five point harness 260 coupled to the seat frame in any suitable manner. In other aspects, any suitable occupant harness may be provided. In one aspect, the five point harness 260 includes shoulder belts 260A1, 260A2 that are coupled to a respective one of the shoulder harness brackets 210A, 210B. Lap belts 260B1, 260B2 of the five point harness 260 are coupled to a respective one of the lap harness brackets 225A, 225B. The anti-submarine belt 260C as noted above, is coupled to the anti-submarine bracket 220. Each of the shoulder belts 260A1, 260A2, lap belts 260B1, 260B2 and the anti-submarine belt 260C is releasably coupled to each other one of the shoulder belts 260A1, 260A2, lap belts 260B1, 260B2 and the anti-submarine belt 260C with a coupling member 260M. The anti-submarine belt 260C may prevent the seat occupant 350 from sliding underneath the lap belts 260B1, 260B2 and out of the vehicle seat 200.

Referring to FIGS. 2, 3, 12A, 12B, 12C, 12D, 12E and 13, the conformal seat insert 240 is coupled to the seat frame 200F in any suitable manner, such as with screws, bolts, pins, etc. The conformal seat insert 240 conforms to the seat occupant 350 and is configured to constrain lateral movement of the seat occupant 350 relative to the seat frame 200F. In one aspect, the conformal seat insert 240 is a rigid insert constructed of any suitable substantially rigid material, such as for exemplary purposes only, Ultem™ manufactured by Saudi Basic Industries Corporation (SABIC) having global headquarters at Houston, Tex. in the United States of America. In one aspect, the conformal seat insert 240 is shaped and sized to engage and constrain lateral movement of at least an upper torso of the seat occupant 350. For example, in one aspect, the conformal seat insert 240 is scalloped so that an acromial point 300 of a shoulder 350S of the seat occupant 350 is inset into the conformal seat insert 240 so that the conformal seat insert includes the crew reference point 300P corresponding to the acromial point 300 of the seat occupant 350.

In one aspect, the conformal seat insert 240 includes an insert frame 240F and a contoured support surface 240SS. In one aspect, the contoured support surface includes a geometry that corresponds to a point cloud 1320 obtained from scanning at least an upper torso 350UT of the seat occupant 350. The contoured support surface 240SS is formed in the insert frame 240F in any suitable manner, such as by additive manufacturing 1345. In one aspect, the insert frame 240F and contoured support surface 240SS are additively manufactured as a one piece unit. In one aspect, the contoured support surface 240SS is formed in the insert frame 240F so as to position the crew reference point 300P in a predetermined position relative to the one or more insert reference features 1200 to place the crew reference point 300P at a predetermined position on the seat frame 200F independent of a size of the seat occupant 350. For example, in one aspect, the insert frame 240F has one or more insert reference features 1200 for locating the insert frame 240F on the seat frame 200F of the vehicle seat 200 in a predetermined position relative to the seat frame 200F. For example, the seat frame 200F includes a recess 200R having sides 200RS1-200RS4 and a back 200RB. In one aspect, the one or more insert references features 1200 includes a protrusion 1210 that extends from a back side 240BS of the conformal seat insert 240. The protrusion 1210 includes sides 1210S1-1210S4 and a back 1210B. Here, for example, the sides 200RS1-200RS4 of the recess 200R are sized relative to the sides 1210S1-1210S4 of the protrusion 1210 to form an interference fit or slight clearance fit so as to repeatably locate the crew reference point 300P in the same location relative to the recess 200R independent of the conformal seat insert 240, 240-1, 240-2, 240-3, 240-n that is coupled to the seat frame 200F. For example, the crew reference point 300P of conformal seat insert 240 will be located in the same location PX, PY relative to the sides 200RS1-200RS4 of the recess 200R that the crew reference point 300P of conformal seat insert 240-1 would be located regardless of the customized contoured support surface 240SS of each conformal seat insert 240, 240-1 and the size of the seat occupant 350, 350-1, 350-2, 350-n. In one aspect, the back 1210B of the protrusion 1210 may contact the back 200RB of the recess 200R so that the crew reference point 300P of conformal seat insert 240 will be located in the same location PZ relative to the back 200RB of the recess 200R that the crew reference point 300P of conformal seat insert 240-1 would be located in regardless of the customized contoured support surface 240SS of each conformal seat insert 240, 240-1. In one aspect, the mating of the recess 200R and the one or more insert reference features 1200 locates the crew reference point 300P along the longitudinal axis LAX of the seat frame 200F. Accordingly, an aspect of the conformal seat insert 240 has a back side 240BS with a reference feature 1200 (protrusion 1210) configured to couple the conformal seat insert 240 to the seat frame 200F, and a front side 240FS with a custom contoured support surface 240SS that includes a crew reference point 300P (corresponding to an acromial point 300 of a shoulder 350S of the seat occupant 350), where the custom contoured support surface 240SS is positioned on the front side 240FS with the crew reference point 300P placed at a location corresponding to the reference feature 1200 on the back side 240BS, such that each custom conformal seat insert 240, 240-1, 240-2, 240-n may be coupled to the seat frame 200 with the crew reference point 300P (corresponding to the acromial point 300 of the respective seat occupant 350, 350-1, 350-2, 350-n) being located in the same location PX, PY relative to the seat frame 200, regardless of the size of the seat occupant 350, 350-1, 350-2, 350-n. For each conformal seat insert 240, 240-1, 240-2, 240-n, the custom contoured support surface 240SS corresponds to a point cloud 1320 obtained from a scan of an upper torso 350UT of the respective seat occupant 350, 350-1, 350-2, 350-n. In other aspects, the conformal seat insert 240 may be located relative to the seat frame 200F in any suitable manner such as with locating pins.

The contoured support surface 240SS has the crew reference point 300P disposed thereon where, as noted above, the crew reference point 300P corresponds to an acromial point of a shoulder 350S of a seat occupant 350 of the adjustable vehicle seat 200. The crew reference point 300P forms a datum from which an eye position of the seat occupant 350 is established relative to instrumentation 370 of the aerospace vehicle 100 in which the adjustable vehicle seat 200 is located, as described herein. In one aspect, the crew reference point 300P is disposed at a location on the contoured support surface 240SS that corresponds with an intersection between a spine 350SPN of the seat occupant 350 and line LN located between a seat occupant right shoulder acromial point 300P1 and a seat occupant left shoulder acromial point 300P2, the line LN being substantially perpendicular to the spine 350SPN. In one aspect, the line LN is located mid-way (e.g. is an averaged location) between the seat occupant right shoulder acromial point 300P1 and seat occupant left shoulder acromial point 300P2. In one aspect, the contoured support surface 240SS is formed in the insert frame 200F so that the crew reference point 300P is disposed along the longitudinal axis LAX of the seat frame 200F (e.g. the spine 350SPN is substantially aligned with the longitudinal axis LAX).

In one aspect, the contoured support surface 340 SS is configured to restrain lateral movement of the seat occupant 350 relative to the seat frame 200. In one aspect, the insert frame 240F includes at least one aperture 240A configured for passage of a portion of a seat occupant restraint system. For example, the insert frame 240F may include two apertures 240A where the shoulder belts 260A1, 260A2 of the five point harness 260 pass through a respective one of the two apertures 240A.

In one aspect, referring to FIGS. 2, 3, 12A, 12B, 12C, 12D, 13 and 14, a method of making the conformal seat insert 240 for the adjustable vehicle seat 200 will be described. In one aspect, the seat occupant 350 is positioned in a recumbent position on a seat replicator 1310 (FIG. 14, Block 1400). In one aspect, the seat replicator 1310 has the same shape (e.g. curvature, etc.) as the vehicle seat 200 and is formed of any suitable material. In one aspect, the recumbent position corresponds to the angle β described above. In one aspect, the angle β is any sufficient angle that positions the shoulders of the seat occupant 350 so that weight of the shoulders is exerted on the seat replicator 1310 so that the shoulders of the seta occupant (as well as the upper torso of the seat occupant 350) conform to the seat curvature of the seat replicator 1310. For example, in one aspect the angle β may be about 45° to about 60°, while in other aspects, the scanning angle of the seat occupant 350 may be more than about 60° or less than about 40°. At least the upper torso 350UT of the seat occupant 350 is scanned (FIG. 14, Block 1405) with any suitable scanner 1300, where the scanning includes any suitable scanning method, such as optical scanning or magnetic scanning (e.g. magnetic resonance imaging), that is capable of generating a three dimensional point cloud 1320 or three dimensional image of the seat occupant 350. In one aspect, the seat replicator 1310 is formed of an optically transparent material where the upper torso 350UT of the seat occupant 350 is optically scanned through the seat replicator 1310.

A solid body model 350M of at least the upper torso 350UT is generated based on the scanning of the upper torso 350UT (FIG. 14, Block 1410). In one aspect, a point cloud 1320 obtained from a scan of an upper torso 350UT of the seat occupant 350, which includes an acromial point 300 of a shoulder 350S of the seat occupant 350, is imported into a three dimensional solid model of the conformal seat insert 240 to establish a custom contoured support surface 240SS in the model, where the custom contoured support surface 240SS is positioned on the front side 240FS of the conformal seat insert 240 with the crew reference point 300P (corresponding to the acromial point 300) placed at a location corresponding to the reference feature 1200 on the back side 240BS, where the reference features 1200 is configured to couple the conformal seat insert 240 to the seat frame 200F. A virtual solid model contoured negative impression 240NEG of the upper torso 350UT is generated (FIG. 14, Block 1415) so that the virtual solid model contoured negative impression 240NEG includes the crew reference point 300P. The conformal seat insert 240 is manufactured based on the solid body model 350M of the upper torso 350UT (FIG. 14, Block 1425) so that the conformal seat insert 240 includes the contoured support surface 240SS having the crew reference point 300P corresponding to an acromial point of a shoulder 350S of the seat occupant 350 of the adjustable vehicle seat 200, the crew reference point 300P being a datum from which an eye position of the seat occupant 350 is established relative to instrumentation 370 of the aerospace vehicle 100 in which the adjustable vehicle seat 200 is located. In one aspect, the conformal seat insert 240 is manufactured by generating a virtual solid model 240M of the conformal seat insert 240 based on the virtual solid model contoured negative impression 240NEG. The solid model 240M can be generated with any suitable computer aided design software (e.g. computer modelling application) 1360 using the point cloud 1320 obtained during scanning of at least the upper torso 350UT of the seat occupant 350 (e.g. the point cloud 1320 is imported to the computer modelling application 1360 in any suitable manner). The solid model 240M of the conformal seat insert 240 is generated so that the crew reference point 300P is located relative to the one or more reference features 1200 of the conformal seat insert 240 for locating the conformal seat insert 240 on the seat frame 200F of the vehicle seat 200 in a predetermined position relative to the seat frame 200F as described herein. The computer aided design software may be used to generate a program that instructs a machine, such as a three dimensional printer 1350 or other computer numerically controlled machine (e.g. such as a milling machine) to form the conformal seat insert 240 by additive manufacturing 1345 or my machining the conformal seat insert from a billet of material. In one aspect, the conformal seat insert 240 is manufactured in any suitable manner so that the contoured support surface 240SS is formed to restrain lateral movement of the seat occupant 350 relative to the seat frame 200F. One or more mounting holes 240H may also be formed in the conformal seat insert 240 in any suitable manner, such as during additive manufacturing 1345 of the conformal seat insert 240 or during a secondary machining process such as milling or drilling of the conformal seat insert 240. The at least one aperture 240A may also be formed in the conformal seat insert 240 during additive manufacturing 1345 of the conformal seat insert 240 or as a secondary machining process where the at least one aperture 240A is cut into the additively manufactured conformal seat insert 240. The conformal seat insert 240 is coupled to the frame 200F of the vehicle seat 200 in any suitable manner (FIG. 14, Block 1430) in the predetermined position (established by the recess 200R and the reference features 1200) relative to the seat frame 200F so that the crew reference point 300P of the conformal seat insert forms the datum from which an eye position of the seat occupant is established relative to the instrumentation 370 of the aerospace vehicle 100 in which the adjustable vehicle seat 200 is located. The method of manufacturing the conformal seat insert 240 in accordance with the aspects of the present disclosure provides for the customization of the vehicle seat 200 in a matter of hours using only a small amount of the seat occupant's 350 time during the scanning process and for measuring the different anthropometric dimensions of the seat occupant 350.

In one aspect, referring to FIGS. 2, 3, 5, 7, 8, 9A-9C 10A, 10B, 11A-11E and 15 the vehicle seat 200 can be reconfigured from mission to mission, or during the same mission, from a first seat occupant 350 having a first set of anthropometric dimensions to a second seat occupant, 350-1, 350-2, 350-n (that is different than the first seat occupant) having a second set of anthropometric dimensions that are different from the first set of anthropometric dimensions of the first seat occupant 350, only by changing the conformal seat insert 240. All other components of the vehicle seat 200 are common for all seat occupants 350, 350-1, 350-2, 350-n and only need be adjusted. As such, each seat occupant 350, 350-1, 350-2, 350-n may have a respective conformal seat insert 240, 240-1, 240-2, 240-n where the conformal seat inserts are interchangeable on a common (i.e. the same) vehicle seat 200.

In one aspect, the vehicle seat 200 may be adjusted by selecting a conformal seat insert 240 from a number of conformal seat inserts 240, 240-1, 240-2, 240-n, where the conformal seat insert corresponds to and was custom manufactured for a predetermined seat occupant 350, 350-1, 350-2, 350-n. For exemplary purposes seat occupant 350 is to occupy the vehicle seat 200 and conformal seat insert 240 (which was custom manufactured for seat occupant 350) is therefore selected. It is noted that seat occupant 350 was also pre-measured, such as during manufacture of the conformal seat insert 240, so that the anthropometric dimensions (e.g. upper and lower leg length, shoulder width, hip width, neck length, etc.) of seat occupant 350 are known.

The conformal seat insert 240 is coupled to the seat frame 200F of the vehicle seat 200 (FIG. 15, Block 1500) at a predetermined position relative to the seat frame 200F. As described above, the predetermined position of the conformal seat insert is established by the interface between the recess 200R and the reference features 1200. As also described above, the conformal seat insert 240 has a crew reference point 300P that corresponds with an acromial point of the seat occupant 350. The seat pan 215 is coupled to the seat frame 200F (FIG. 15, Block 1505) in one of a plurality of positions 1A-9A, as described above, relative to the seat frame 200F so that the seat pan 215 is located a predetermined distance X1 from the crew reference point 300P to position an eye 350E of the seat occupant 350 relative to instrumentation 370 within the aerospace vehicle 100 where the position of the eye 350E of the seat occupant 350 is decoupled from a size of the seat occupant 350. In one aspect, the predetermined distance X1 is the distance between the crew reference point 300P and the support surface 215SS of the seat pan 215. The predetermined distance X1 may be set based on the anthropometric dimensions obtained from the seat occupant 350. The head rest 205 is coupled to the seat frame 200F, as described above, at a predetermined position relative to the crew reference point so that the head rest is located a predetermined distance X2 from the crew reference point 300P. The predetermined distance X2 may be set based on the anthropometric dimensions obtained from the seat occupant 350.

A leg support 230 is coupled to the seat frame 200F (FIG. 15, Block 1515) as described above. The leg support 230 may be adjusted depending on a size of the seat occupant 350. For example, an intersection between the seat frame 200F and the seat pan 215 defines a seat reference point 200RP (FIG. 3). The dimensions of the leg support 230 may be adjusted relative to the seat reference point 200R using the anthropometric dimensions of the seat occupant 350. For example, an upper leg length dimension X6 and a lower leg dimension X7 of the leg support 230 are adjusted, as described above, relative to the seat reference point 200RP according to the anthropometric dimensions of the seat occupant 350. In one aspect, dimensions of the leg support, such as angle θ between an upper leg and a lower leg of the seat occupant may be adjusted as described above.

In one aspect, dimensions of the seat occupant restraint, such as the five point harness 260, are adjusted (FIG. 15, Block 1525) depending on the size of the seat occupant 350. For example, using the predetermined anthropometric dimensions of the seat occupant 350 a distance X3 between the shoulder harness brackets 210A, 210B are adjusted relative to the crew reference point 300P. The dimensions X5 between the lap harness brackets 225A, 225B may also be adjusted relative to the crew reference point 300P using the predetermined anthropometric dimensions of the seat occupant 350. The dimension X4 of the anti-submarine bracket 220 may also be adjusted relative to the seat reference point 200RP using the predetermined anthropometric dimensions of the seat occupant 350.

With the dimensions of the vehicle seat 200 being pre-adjusted using the predetermined anthropometric dimensions of the seat occupant 350, the seat occupant 350 may sit in the vehicle seat 200. The dimensions, e.g. dimensions X1-X7, of the vehicle seat 200 may be further adjusted to suit a desired comfort level of the seat occupant 350.

As described herein the aspects of the present disclosure provide an adjustable vehicle seat 200 that can be adjusted to suit many different seat occupants 350, 350-1, 350-2, 350-n. All of the seat adjustments are ultimately made with reference to the crew reference point 300P, which is located at the same position relative to the seat frame 200F for all seat occupants 350, 350-1, 350-2, 350-n (although the support surface 240SS of the conformal seat insert 240 is custom made for each seat occupant 350, 350-1, 350-2, 350-n). As described herein, so that the eye position of the many different seat occupants 350, 350-1, 350-2, 350-n provides the field of view FOV for viewing the instrumentation 370 during high g maneuvers of the aerospace vehicle 100.

The following are provided in accordance with the aspects of the present disclosure:

A1. An adjustable vehicle seat comprising:
a seat frame forming a seat back, the seat frame being configured to couple with an aerospace vehicle;
a seat pan coupled to the seat frame, where one or more of the seat frame and the seat pan is configured to couple the seat pan to the seat frame in one of a plurality of positions relative to the seat frame so that an eye position of a seat occupant relative to instrumentation within the aerospace vehicle is decoupled from a size of the seat occupant.

A2. The adjustable vehicle seat of claim A1, further comprising a head rest coupled to the seat frame, where one or more of the seat frame and the head rest is configured to couple the head rest to the seat frame in one of a plurality of positions relative to the seat frame.

A3. The adjustable vehicle seat of claim A1, further comprising shoulder harness brackets coupled to the seat frame, where one or more of the seat frame and the shoulder harness brackets is configured to couple each of the shoulder harness brackets to the seat frame in one of a plurality of positions relative to the seat frame and each other.

A4. The adjustable vehicle seat of claim A3, wherein a distance between the shoulder harness brackets is variable.

A5. The adjustable vehicle seat of claim A1, further comprising an anti-submarine bracket coupled to the seat frame, where one or more of the seat frame and the anti-submarine bracket is configured to couple the anti-submarine bracket to the seat frame in one of a plurality of positions relative to the seat frame.

A6. The adjustable vehicle seat of claim A1, further comprising lap harness brackets coupled to the seat frame, where one or more of the seat frame and the lap harness brackets is configured to couple the lap harness brackets to the seat frame in one of a plurality of positions relative to the seat frame.

A7. The adjustable vehicle seat of claim A6, wherein a distance between the lap harness brackets is variable.

A8. The adjustable vehicle seat of claim A1, further comprising a leg support coupled to the seat frame, where one or more of the seat frame and the leg support is configured to couple the leg support to the seat frame in one of a plurality of positions relative to the seat frame.

A9. The adjustable vehicle seat of claim A8, wherein the leg support is configured to support both legs of the seat occupant.

A10. The adjustable vehicle seat of claim A8, wherein the leg support comprises leg flail restraints.

A11. The adjustable vehicle seat of claim A10, wherein the leg flail restraints include handles.

A12. The adjustable vehicle seat of claim A8, wherein the leg support is coupled to the seat frame with at least one hitch pin.

A13. The adjustable vehicle seat of claim A8, wherein the leg support controls an angle between an upper leg and a lower leg of the seat occupant.

A14. The adjustable vehicle seat of claim A8, wherein the leg support further comprises:
a leg support base that is coupled to the seat frame; and
a foot rest, where one or more of the leg support base and the foot rest is configured to couple the foot rest to the leg support base in one of a plurality of positions relative to the leg support base.

A15. The adjustable vehicle seat of claim A14, wherein the foot rest is configured to support both feet of the seat occupant.

A16. The adjustable vehicle seat of claim A14, wherein the foot rest comprises foot flail restraints.

A17. The adjustable vehicle seat of claim A14, wherein the foot rest is coupled to the leg support base with at least one hitch pin.

A18. The adjustable vehicle seat of claim A14, wherein the leg support base comprises:
a first base member configured for coupling to the seat frame;
a second base member configured for coupling to the foot rest, the second base member is coupled to the first base member about a pivot axis; and
a brace member configured for coupling to the second base member and at least one of the first base member and the seat frame where the brace member controls rotation of the second base member, relative to the first base member, about the pivot axis.

A19. The adjustable vehicle seat of claim A1, further comprising a five point harness coupled to the seat frame.

A20. The adjustable vehicle seat of claim A1, further comprising a conformal seat insert coupled to the seat frame, the conformal seat insert conforming to the seat occupant and being configured to constrain lateral movement of the seat occupant relative to the seat frame.

A21. The adjustable vehicle seat of claim A20, wherein the conformal seat insert is a rigid insert.

A22. The adjustable vehicle seat of claim A20, wherein the conformal seat insert is configured to engage and constrain lateral movement of at least an upper torso of the seat occupant.

A23. The adjustable vehicle seat of claim A20, wherein the conformal seat insert is scalloped so that an acromial point of a shoulder of the seat occupant is inset into the conformal seat insert and the acromial point of the conformal seat insert corresponds to a crew reference point, wherein the seat pan is positionable in one of a plurality of positions relative to the seat frame so that the seat pan is located a predetermined distance from the crew reference point to position an eye of the seat occupant relative to instrumentation within an aerospace vehicle such that the position of the eye of the seat occupant is decoupled from a size of the seat occupant.

B1. An adjustable vehicle seat comprising:

a seat frame forming a seat back, the seat frame being configured to couple with an aerospace vehicle;

a conformal seat insert coupled to the seat frame; and a seat pan coupled to the seat frame, where one or more of the seat frame and the seat pan is configured to couple the seat pan to the seat frame in one of a plurality of positions relative to the conformal seat insert so that an eye position of a seat occupant relative to instrumentation within the aerospace vehicle is decoupled from a size of the seat occupant.

B2. The adjustable vehicle seat of claim B1, further comprising a head rest coupled to the seat frame, where one or more of the seat frame and the head rest is configured to couple the head rest to the seat frame in one of a plurality of positions relative to the conformal seat insert.

B3. The adjustable vehicle seat of claim B1, further comprising shoulder harness brackets coupled to the seat frame, where one or more of the seat frame and the shoulder harness brackets is configured to couple each of the shoulder harness brackets to the seat frame in one of a plurality of positions relative to the conformal seat insert and each other.

B4. The adjustable vehicle seat of claim B3, wherein a distance between the shoulder harness brackets is variable.

B5. The adjustable vehicle seat of claim B1, further comprising an anti-submarine bracket coupled to the seat frame, where one or more of the seat frame and the anti-submarine bracket is configured to couple the anti-submarine bracket to the seat frame in one of a plurality of positions relative to the conformal seat insert.

B6. The adjustable vehicle seat of claim B1, further comprising lap harness brackets coupled to the seat frame, where one or more of the seat frame and the lap harness brackets is configured to couple the lap harness brackets to the seat frame in one of a plurality of positions relative to the conformal seat insert.

B7. The adjustable vehicle seat of claim B6, wherein a distance between the lap harness brackets is variable.

B8. The adjustable vehicle seat of claim B1, further comprising a leg support coupled to the seat frame, where one or more of the seat frame and the leg support is configured to couple the leg support to the seat frame in one of a plurality of positions relative to the conformal seat insert.

B9. The adjustable vehicle seat of claim B8, wherein the leg support is configured to support both legs of the seat occupant.

B10. The adjustable vehicle seat of claim B8, wherein the leg support comprises leg flail restraints.

B11. The adjustable vehicle seat of claim B10, wherein the leg flail restraints include handles.

B12. The adjustable vehicle seat of claim B8, wherein the leg support is coupled to the seat frame with at least one hitch pin.

B13. The adjustable vehicle seat of claim B8, wherein the leg support controls an angle between an upper leg and a lower leg of the seat occupant.

B14. The adjustable vehicle seat of claim B8, wherein the leg support further comprises:

a leg support base that is coupled to the seat frame; and a foot rest, where one or more of the leg support base and the foot rest is configured to couple the foot rest to the leg support base in one of a plurality of positions relative to the leg support base.

B15. The adjustable vehicle seat of claim B14, wherein the foot rest is configured to support both feet of the seat occupant.

B16. The adjustable vehicle seat of claim B14, wherein the foot rest comprises foot flail restraints.

B17. The adjustable vehicle seat of claim B14, wherein the foot rest is coupled to the leg support base with at least one hitch pin.

B18. The adjustable vehicle seat of claim B14, wherein the leg support base comprises:

a first base member configured for coupling to the seat frame;

a second base member configured for coupling to the foot rest, the second base member is coupled to the first base member about a pivot axis; and a brace member configured for coupling to the second base member and at least one of the first base member and the seat frame where the brace member controls rotation of the second base member, relative to the first base member, about the pivot axis.

B19. The adjustable vehicle seat of claim B1, further comprising a five point harness coupled to the seat frame.

B20. The adjustable vehicle seat of claim B1, wherein the conformal seat insert conforms to the seat occupant and is configured to constrain lateral movement of the seat occupant relative to the seat frame.

B21. The adjustable vehicle seat of claim B1, wherein the conformal seat insert is a rigid insert.

B22. The adjustable vehicle seat of claim B1, wherein the conformal seat insert is configured to engage and constrain lateral movement of at least an upper torso of the seat occupant.

B23. The adjustable vehicle seat of claim B1, wherein the conformal seat insert is scalloped so that an acromial point of a shoulder of the seat occupant is inset into the conformal seat insert and the acromial point of the conformal seat insert corresponds to a crew reference point, wherein the seat pan is positionable in one of a plurality of positions relative to the seat frame so that the seat pan is located a predetermined distance from the crew reference point to position an eye of the seat occupant relative to instrumentation within an aerospace vehicle such that the position of the eye of the seat occupant is decoupled from a size of the seat occupant.

C1. A vehicle comprising:

a vehicle frame; and an adjustable vehicle seat comprising a seat frame forming a seat back, the seat frame being configured to couple with the vehicle frame;

a seat pan coupled to the seat frame, where one or more of the seat frame and the seat pan is configured to couple the seat pan to the seat frame in one of a plurality of positions relative to the seat frame so that an eye position of a seat occupant relative to instrumentation within the aerospace vehicle is decoupled from a size of the seat occupant.

C2. The vehicle of claim C1, further comprising a head rest coupled to the seat frame, where one or more of the seat frame and the head rest is configured to couple the head rest to the seat frame in one of a plurality of positions relative to the seat frame.

C3. The vehicle of claim C1, further comprising shoulder harness brackets coupled to the seat frame, where one or more of the seat frame and the shoulder harness brackets is configured to couple each of the shoulder harness brackets to the seat frame in one of a plurality of positions relative to the seat frame and each other.

C4. The vehicle of claim C3, wherein a distance between the shoulder harness brackets is variable.

C5. The vehicle of claim C1, further comprising an anti-submarine bracket coupled to the seat frame, where one or more of the seat frame and the anti-submarine bracket is configured to couple the anti-submarine bracket to the seat frame in one of a plurality of positions relative to the seat frame.

C6. The vehicle of claim C1, further comprising lap harness brackets coupled to the seat frame, where one or more of the seat frame and the lap harness brackets is configured to couple the lap harness brackets to the seat frame in one of a plurality of positions relative to the seat frame.

C7. The vehicle of claim C6, wherein a distance between the lap harness brackets is variable.

C8. The vehicle of claim C1, further comprising a leg support coupled to the seat frame, where one or more of the seat frame and the leg support is configured to couple the leg support to the seat frame in one of a plurality of positions relative to the seat frame.

C9. The vehicle of claim C8, wherein the leg support is configured to support both legs of the seat occupant.

C10. The vehicle of claim C8, wherein the leg support comprises leg flail restraints.

C11. The vehicle of claim C10, wherein the leg flail restraints include handles.

C12. The vehicle of claim C8, wherein the leg support is coupled to the seat frame with at least one hitch pin.

C13. The vehicle of claim C8, wherein the leg support controls an angle between an upper leg and a lower leg of the seat occupant.

C14. The vehicle of claim C8, wherein the leg support further comprises:
a leg support base that is coupled to the seat frame; and
a foot rest, where one or more of the leg support base and the foot rest is configured to couple the foot rest to the leg support base in one of a plurality of positions relative to the leg support base.

C15. The vehicle of claim C14, wherein the foot rest is configured to support both feet of the seat occupant.

C16. The vehicle of claim C14, wherein the foot rest comprises foot flail restraints.

C17. The vehicle of claim C14, wherein the foot rest is coupled to the leg support base with at least one hitch pin.

C18. The vehicle of claim C14, wherein the leg support base comprises:
a first base member configured for coupling to the seat frame;
a second base member configured for coupling to the foot rest, the second base member is coupled to the first base member about a pivot axis; and
a brace member configured for coupling to the second base member and at least one of the first base member and the seat frame where the brace member controls rotation of the second base member, relative to the first base member, about the pivot axis.

C19. The vehicle of claim C1, further comprising a five point harness coupled to the seat frame.

C20. The vehicle of claim C1, further comprising a conformal seat insert coupled to the seat frame, the conformal seat insert conforming to the seat occupant and being configured to constrain lateral movement of the seat occupant relative to the seat frame.

C21. The vehicle of claim C20, wherein the conformal seat insert is a rigid insert.

C22. The vehicle of claim C20, wherein the conformal seat insert is configured to engage and constrain lateral movement of at least an upper torso of the seat occupant.

C23. The vehicle of claim C20, wherein the conformal seat insert is scalloped so that an acromial point of a shoulder of the seat occupant is inset into the conformal seat insert and the acromial point of the conformal seat insert corresponds to a crew reference point, wherein the seat pan is positionable in one of a plurality of positions relative to the seat frame so that the seat pan is located a predetermined distance from the crew reference point to position an eye of the seat occupant relative to instrumentation within an aerospace vehicle such that the position of the eye of the seat occupant is decoupled from a size of the seat occupant.

D1. A method of adjusting a vehicle seat, the method comprising:
coupling a conformal seat insert to a seat frame of the vehicle seat at a predetermined position relative to the seat frame, the conformal seat insert having a crew reference point that corresponds with an acromial point of a seat occupant; and
coupling a seat pan to the seat frame in one of a plurality of positions relative to the seat frame so that the seat pan is located a predetermined distance from the crew reference point to position an eye of the seat occupant relative to instrumentation within an aerospace vehicle where the position of the eye of the seat occupant is decoupled from a size of the seat occupant.

D2. The method of claim D1, further comprising coupling a head rest to the seat frame at a predetermined position relative to the crew reference point.

D3. The method of claim D1, further comprising coupling a leg support to the seat frame.

D4. The method of claim D3, wherein an intersection between the seat frame and the seat pan defines a seat reference point, the method further comprising adjusting dimensions of the leg support relative to the seat reference point depending on the size of the seat occupant.

D5. The method of claim D4, wherein adjusting dimensions of the leg support includes adjusting an upper leg length dimension.

D6. The method of claim D4, wherein adjusting dimensions of the leg support includes adjusting a lower leg length dimension.

D7. The method of claim D4, wherein adjusting dimensions of the leg support includes adjusting an angle between an upper leg and a lower leg of the seat occupant.

D8. The method of claim D1, further comprising adjusting seat occupant restraint dimensions depending on a size of the seat occupant.

D9. The method of claim D1, further comprising measuring at least one anthropomorphic dimension of the seat occupant.

E1. A conformal seat insert for an adjustable vehicle seat, the conformal seat insert comprising:
an insert frame, the insert frame having one or more insert reference features for locating the insert frame on a seat frame of the vehicle seat in a predetermined position relative to the seat frame; and
a contoured support surface formed in the insert frame, the contoured support surface having a crew reference point corresponding to an acromial point of a shoulder of a seat occupant of the adjustable vehicle seat, the crew reference point being a datum from which an eye position of the seat occupant is established relative to instrumentation of an aerospace vehicle in which the adjustable vehicle seat is located.

E2. The conformal seat insert of claim E1, wherein the contoured support surface is configured to restrain lateral movement of the seat occupant relative to the seat frame.

E3. The conformal seat insert of claim E1, wherein the insert frame and contoured support surface are additively manufactured as a one piece unit.

E4. The conformal seat insert of claim E1, wherein the insert frame includes at least one aperture configured for passage of a portion of a seat occupant restraint system.

E5. The conformal seat insert of claim E1, wherein the insert frame is constructed of a substantially rigid material.

E6. The conformal seat insert of claim E1, wherein the contoured support surface is formed in the insert frame so as to position the crew reference point in a predetermined position relative to the one or more insert reference features to place the crew reference point at a predetermined position on the seat frame independent of a size of the seat occupant.

E7. The conformal seat insert of claim E1, wherein the crew reference point is disposed at a location on the contoured support surface that corresponds with an intersection between a spine of the seat occupant and line located mid-way between a seat occupant right shoulder acromial point and a seat occupant left shoulder acromial point, the line being substantially perpendicular to the spine.

E8. The conformal seat insert of the claim E1, wherein the crew reference point is disposed along a longitudinal axis of the seat frame.

E9. The conformal seat insert of claim E1, wherein the contoured support surface comprises a geometry that corresponds to a point cloud obtained from scanning an upper torso of the seat occupant.

F1. A method of making a conformal seat insert for an adjustable vehicle seat, the method comprising:
    positioning a seat occupant in a recumbent position on a seat replicator;
    scanning an upper torso of the seat occupant and generating a solid body model of the upper torso based on the scanning of the upper torso; and
    generating the conformal seat insert based on the solid body model of the upper torso so that the conformal seat insert includes a contoured support surface having a crew reference point corresponding to an acromial point of a shoulder of a seat occupant of the adjustable vehicle seat, the crew reference point being a datum from which an eye position of the seat occupant is established relative to instrumentation of an aerospace vehicle in which the adjustable vehicle seat is located.

F2. The method of claim F1, wherein generating the conformal seat insert comprises additively manufacturing the conformal seat insert.

F3. The method of claim F1, further comprising generating a virtual solid model contoured negative impression of the upper torso so that the virtual solid model contoured negative impression includes the crew reference point.

F4. The method of claim F3, further comprising generating a virtual solid model of the conformal seat insert based on the virtual solid model contoured negative impression.

F5. The method of claim F1, wherein scanning the upper torso of the seat occupant comprises optically scanning the upper torso of the seat occupant.

F6. The method of claim F1, wherein the seat replicator comprises a transparent material and scanning the upper torso of the seat occupant comprises optically scanning the upper torso of the seat occupant.

F7. The method of claim F1, wherein generating the conformal seat insert comprises locating the crew reference point relative to one or more reference features of the conformal seat insert for locating the conformal seat insert on a seat frame of the vehicle seat in a predetermined position relative to the seat frame.

F8. The method of claim F1, wherein the contoured support surface is formed to restrain lateral movement of the seat occupant relative to the seat frame.

F9. The method of claim F1, further comprising forming at least one aperture in the conformal seat insert that is configured for passage of a portion of a seat occupant restraint system.

G1. A method of making an adjustable vehicle seat, the method comprising:
    providing a seat frame;
    positioning a seat occupant in a recumbent position on a seat replicator;
    scanning an upper torso of the seat occupant and generating a solid body model of the upper torso based on the scanning of the upper torso;
    generating a conformal seat insert based on the solid body model of the upper torso so that the conformal seat insert includes a contoured support surface having a crew reference point corresponding to an acromial point of a shoulder of a seat occupant of the adjustable vehicle seat; and
    coupling the conformal seat insert to the seat frame in a predetermined position relative to the seat frame so that the crew reference point of the conformal seat insert forms a datum from which an eye position of the seat occupant is established relative to instrumentation of an aerospace vehicle in which the adjustable vehicle seat is located.

G2. The method of claim G1, wherein generating the conformal seat insert comprises additively manufacturing the conformal seat insert.

G3. The method of claim G1, further comprising generating a virtual solid model contoured negative impression of the upper torso so that the virtual solid model contoured negative impression includes the crew reference point.

G4. The method of claim G3, further comprising generating a virtual solid model of the conformal seat insert based on the virtual solid model contoured negative impression.

G5. The method of claim G1, wherein scanning the upper torso of the seat occupant comprises optically scanning the upper torso of the seat occupant.

G6. The method of claim G1, wherein scanning the upper torso of the seat occupant comprises magnetically scanning the upper torso of the seat occupant.

G7. The method of claim G1, wherein the seat replicator comprises a transparent material and scanning the upper torso of the seat occupant comprises optically scanning the upper torso of the seat occupant through the seat replicator.

G8. The method of claim G1, wherein generating the conformal seat insert comprises locating the crew reference point relative to one or more reference features of the conformal seat insert where the reference features of the conformal seat insert locate the conformal seat insert on a seat frame of the vehicle seat in a predetermined position relative to the seat frame.

G9. The method of claim G1, wherein the contoured support surface is formed to restrain lateral movement of the seat occupant relative to the seat frame.

G10. The method of claim G1, further comprising forming at least one aperture in the conformal seat insert where the at least one aperture is configured for passage of a portion of a seat occupant restraint system.

G11. The method of claim G1, wherein generating a solid body model of the upper torso includes importing a point cloud obtained during scanning the upper torso of the seat occupant into a computer modeling application.

G12. The method of claim G1, wherein the solid body model of the upper torso is a three dimensional model.

G13. The method of claim G1, wherein generating a conformal seat insert includes printing the conformal seat insert with a three dimensional printer.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 14 and 15, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 14 and 15 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. An adjustable vehicle seat comprising:
    a seat frame forming a seat back, where:
        the seat frame is configured to couple with an aerospace vehicle, and
        the seat back includes a crew reference point that defines a datum from which an eye position of a seat occupant is established to locate the eye position in a predetermined spatial relationship with instrumentation of the aerospace vehicle; and
    a seat pan coupled to the seat frame, where the seat pan is coupled to the seat frame in one of a plurality of positions relative to the crew reference point so that the eye position of the seat occupant is in the predetermined spatial relationship with the instrumentation as established by the datum so as to decouple the eye position of the seat occupant from a size of the seat occupant.

2. The adjustable vehicle seat of claim 1, further comprising a head rest coupled to the seat frame, where one or more of the seat frame and the head rest is configured to couple the head rest to the seat frame in one of a plurality of positions relative to the seat frame.

3. The adjustable vehicle seat of claim 1, further comprising shoulder harness brackets coupled to the seat frame, where one or more of the seat frame and the shoulder harness brackets is configured to couple each of the shoulder harness brackets to the seat frame in one of a plurality of positions relative to the seat frame and each other.

4. The adjustable vehicle seat of claim 1, further comprising an anti-submarine bracket coupled to the seat frame, where one or more of the seat frame and the anti-submarine bracket is configured to couple the anti-submarine bracket to the seat frame in one of a plurality of positions relative to the seat frame.

5. The adjustable vehicle seat of claim 1, further comprising lap harness brackets coupled to the seat frame, where one or more of the seat frame and the lap harness brackets is configured to couple the lap harness brackets to the seat frame in one of a plurality of positions relative to the seat frame.

6. The adjustable vehicle seat of claim 1, further comprising a leg support coupled to the seat frame, where one or more of the seat frame and the leg support is configured to couple the leg support to the seat frame in one of a plurality of positions relative to the seat frame.

7. The adjustable vehicle seat of claim 6, wherein the leg support further comprises:
    a leg support base that is coupled to the seat frame; and
    a foot rest, where one or more of the leg support base and the foot rest is configured to couple the foot rest to the leg support base in one of a plurality of positions relative to the leg support base.

8. The adjustable vehicle seat of claim 7, wherein the leg support base comprises:
    a first base member configured for coupling to the seat frame;
    a second base member configured for coupling to the foot rest, the second base member is coupled to the first base member about a pivot axis; and
    a brace member configured for coupling to the second base member and at least one of the first base member and the seat frame where the brace member controls rotation of the second base member, relative to the first base member, about the pivot axis.

9. The adjustable vehicle seat of claim 1, wherein the seat pan is coupled to the seat frame in the one of the plurality of positions by a plurality of coupling apertures that are spaced from each other.

10. A vehicle comprising:
    a vehicle frame; and
    the adjustable vehicle seat of claim 1,
        where the seat frame is configured to couple with the vehicle frame.

11. The vehicle of claim 10, further comprising a conformal seat insert coupled to the seat frame, the conformal seat insert conforming to the seat occupant and being configured to constrain lateral movement of the seat occupant relative to the seat frame.

12. The vehicle of claim 11, wherein the conformal seat insert is configured to engage and constrain lateral movement of at least an upper torso of the seat occupant.

13. The vehicle of claim 11, wherein the conformal seat insert is scalloped so that an acromial point of a shoulder of the seat occupant is inset into the conformal seat insert and the acromial point of the conformal seat insert corresponds to a crew reference point, wherein the seat pan is positionable in one of a plurality of positions relative to the seat frame so that the seat pan is located a predetermined distance from the crew reference point to position an eye of the seat occupant relative to instrumentation within an aerospace vehicle such that the position of the eye of the seat occupant is decoupled from a size of the seat occupant.

14. The vehicle of claim 10, further comprising a leg support coupled to the seat frame, where one or more of the seat frame and the leg support is configured to couple the leg support to the seat frame in one of a plurality of positions relative to the seat frame.

15. The vehicle of claim 14, wherein the leg support further comprises:
    a leg support base that is coupled to the seat frame; and
    a foot rest, where one or more of the leg support base and the foot rest is configured to couple the foot rest to the leg support base in one of a plurality of positions relative to the leg support base.

16. The vehicle of claim 10, further comprising lap harness brackets coupled to the seat frame, where one or more of the seat frame and the lap harness brackets is configured to couple the lap harness brackets to the seat frame in one of a plurality of positions relative to the seat frame.

17. The vehicle of claim 10, further comprising a head rest coupled to the seat frame, where one or more of the seat frame and the head rest is configured to couple the head rest to the seat frame in one of a plurality of positions relative to the seat frame.

18. The vehicle of claim 10, further comprising shoulder harness brackets coupled to the seat frame, where one or more of the seat frame and the shoulder harness brackets is configured to couple each of the shoulder harness brackets to the seat frame in one of a plurality of positions relative to the seat frame and each other.

19. The vehicle of claim 10, further comprising an anti-submarine bracket coupled to the seat frame, where one or more of the seat frame and the anti-submarine bracket is configured to couple the anti-submarine bracket to the seat frame in one of a plurality of positions relative to the seat frame.

20. A method of adjusting the vehicle seat of claim 1, the method comprising:
    coupling a conformal seat insert to the seat frame of the vehicle seat at a predetermined position relative to the seat frame, the conformal seat insert having a crew reference point that corresponds with an acromial point of a seat occupant; and coupling the seat pan to the seat frame in one of the plurality of positions relative to the seat frame so that the seat pan is located a predetermined distance from the crew reference point to position an eye of the seat occupant relative to instrumentation within the aerospace vehicle where the position of the eye of the seat occupant is decoupled from a size of the seat occupant.

21. The method of claim 20, further comprising coupling a head rest to the seat frame at a predetermined position relative to the crew reference point.

22. The method of claim 20, further comprising:
coupling a leg support to the seat frame; and
wherein an intersection between the seat frame and the seat pan defines a seat reference point, the method further comprising adjusting dimensions of the leg support relative to the seat reference point depending on the size of the seat occupant.

23. The method of claim 22, wherein adjusting dimensions of the leg support includes one or more of:
adjusting an upper leg length dimension;
adjusting a lower leg length dimension; and
adjusting an angle between an upper leg and a lower leg of the seat occupant.

24. The method of claim 20, further comprising adjusting seat occupant restraint dimensions depending on a size of the seat occupant.

25. The method of claim 20, further comprising measuring at least one anthropomorphic dimension of the seat occupant.

26. An adjustable vehicle seat comprising:
a seat frame forming a seat back, the seat frame being configured to couple with an aerospace vehicle;
a conformal seat insert coupled to the seat frame and forming a portion of the seat back, the conformal seat insert includes a crew reference point that defines a datum from which an eye position of a seat occupant is established to locate the eye position in a predetermined spatial relationship with instrumentation of the aerospace vehicle; and
a seat pan coupled to the seat frame in one of a plurality of positions relative to the crew reference point so that the eye position of the seat occupant is in the predetermined spatial relationship with the instrumentation as established from the datum so as to decouple the eye position of the seat occupant from a size of the seat occupant.

27. The adjustable vehicle seat of claim 26, further comprising one or more of:
a head rest coupled to the seat frame, where one or more of the seat frame and the head rest is configured to couple the head rest to the seat frame in one of a plurality of positions relative to the conformal seat insert;
shoulder harness brackets coupled to the seat frame, where one or more of the seat frame and the shoulder harness brackets is configured to couple each of the shoulder harness brackets to the seat frame in one of a plurality of positions relative to the conformal seat insert and each other;
an anti-submarine bracket coupled to the seat frame, where one or more of the seat frame and the anti-submarine bracket is configured to couple the anti-submarine bracket to the seat frame in one of a plurality of positions relative to the conformal seat insert;
lap harness brackets coupled to the seat frame, where one or more of the seat frame and the lap harness brackets is configured to couple the lap harness brackets to the seat frame in one of a plurality of positions relative to the conformal seat insert; and
a leg support coupled to the seat frame, where one or more of the seat frame and the leg support is configured to couple the leg support to the seat frame in one of a plurality of positions relative to the conformal seat insert.

28. The adjustable vehicle seat of claim 26, further comprising a five point harness coupled to the seat frame.

29. The adjustable vehicle seat of claim 26, wherein the conformal seat insert conforms to the seat occupant and is configured to constrain lateral movement of the seat occupant relative to the seat frame.

30. The adjustable vehicle seat of claim 26, wherein the conformal seat insert is a rigid insert.

31. The adjustable vehicle seat of claim 26, wherein the conformal seat insert is configured to engage and constrain lateral movement of at least an upper torso of the seat occupant.

32. The adjustable vehicle seat of claim 26, wherein the conformal seat insert is scalloped so that an acromial point of a shoulder of the seat occupant is inset into the conformal seat insert and the acromial point of the conformal seat insert corresponds to the crew reference point, wherein the seat pan is positionable in one of a plurality of positions relative to the seat frame so that the seat pan is located a predetermined distance from the crew reference point to position an eye of the seat occupant relative to instrumentation within an aerospace vehicle such that the position of the eye of the seat occupant is decoupled from a size of the seat occupant.

33. The adjustable vehicle seat of claim 26, wherein the seat pan is coupled to the seat frame in the one of the plurality of positions by a plurality of coupling apertures that are spaced from each other.

* * * * *